(12) United States Patent
La Civita et al.

(10) Patent No.: US 9,786,184 B2
(45) Date of Patent: Oct. 10, 2017

(54) SECURE TRANSMISSION OF AN AIRCRAFT TRAJECTORY

(71) Applicant: The Boeing Company, Chicago, IL (US)

(72) Inventors: Marco La Civita, Madrid (ES); Miguel Vilaplana, Madrid (ES); Nicolas Pena Ortiz, Madrid (ES)

(73) Assignee: THE BOEING COMPANY, Chicago, IL (US)

( * ) Notice: Subject to any disclaimer, the term of this patent is extended or adjusted under 35 U.S.C. 154(b) by 103 days.

(21) Appl. No.: 14/157,618

(22) Filed: Jan. 17, 2014

(65) Prior Publication Data
US 2014/0229094 A1    Aug. 14, 2014

(30) Foreign Application Priority Data
Feb. 13, 2013    (EP) ..................................... 13382043

(51) Int. Cl.
*G06F 19/00*    (2011.01)
*G06G 7/70*    (2006.01)
(Continued)

(52) U.S. Cl.
CPC .......... *G08G 5/0004* (2013.01); *G08G 5/0008* (2013.01); *G08G 5/0013* (2013.01); *H04B 7/18506* (2013.01)

(58) Field of Classification Search
CPC ...... G08G 5/0013; G08G 5/00; G08G 5/0004; B64D 1/00; B64C 19/00
(Continued)

(56) References Cited

U.S. PATENT DOCUMENTS 8,700,317 B1 *    4/2014    Wilder et al. ................. 701/423
2003/0030581 A1    2/2003    Roy
(Continued)

FOREIGN PATENT DOCUMENTS

EP    2040137    3/2009
EP    2685440    1/2014
(Continued)

OTHER PUBLICATIONS

Daniels et al., Creating a Realistic Weather Environment for Motion-Based Piloted Flight Simulation, Aug. 24, 2012.*
(Continued)

*Primary Examiner* — Mahmoud Ismail

(57) ABSTRACT

The present disclosure relates to the secure transmission of an aircraft trajectory that is to be flown or that has been flown. A ground-referenced description of the trajectory of the aircraft expressed in ground-referenced parameters is converted, using a description of an imaginary atmospheric model describing imaginary atmospheric conditions along the trajectory, into an air-referenced description of the aircraft trajectory expressed in air-referenced parameters. For decryption, knowledge of the imaginary atmospheric conditions allows the air-referenced description of the aircraft trajectory to be converted back into the ground-referenced description of the aircraft trajectory. Thus, the ground-referenced trajectory may be though of as the plain text, the imaginary atmospheric model as the cipher key and the air-referenced trajectory as the cipher text.

16 Claims, 9 Drawing Sheets

(51) Int. Cl.
G06G 7/76 (2006.01)
G08G 5/00 (2006.01)
H04B 7/185 (2006.01)

(58) Field of Classification Search
USPC .......................................................... 701/120
See application file for complete search history.

(56) References Cited

U.S. PATENT DOCUMENTS

| | | |
|---|---|---|
| 2006/0069497 A1 | 3/2006 | Wilson, Jr. |
| 2009/0138716 A1 | 5/2009 | Leclercq |
| 2010/0305781 A1 | 12/2010 | Felix |
| 2012/0177198 A1* | 7/2012 | Cabos ........................ 380/270 |
| 2013/0028174 A1 | 1/2013 | Cabos |
| 2013/0317672 A1* | 11/2013 | Magana Casado et al. ...... 701/3 |
| 2014/0358415 A1* | 12/2014 | McDonald et al. .......... 701/120 |

FOREIGN PATENT DOCUMENTS

| | | |
|---|---|---|
| WO | 2007115246 | 10/2007 |
| WO | 2009042405 | 4/2009 |

OTHER PUBLICATIONS

European Search Report and European Search Opinion, dated May 14, 2013; Applicant: The Boeing Company; Application No. 13382043.1-1803; 8 pages.

Whitfield Diffie and Martin E. Hellman, Member, IEEE; "New Directions in Cryptography"; IEEE Transactions on Information Theory, vol. IT-22, No. 6, Nov. 1976; pp. 644-654.

Samuelson K et al: "Enhanced ADS-B Research", 2006 IEEE Aerospace Conference; Big Sky, Montana; Mar. 4-11, 2006; pp. 1-7.

Eduardo Gallo: Prediction of descent trajectories based on Aircraft Intent; Digital Avionics Systems Conference (DASC), 2010 IEEE/AIAA 29th, IEEE, Piscataway, NJ, USA; Oct. 3, 2010; pp. 2.d.1-1.

* cited by examiner

| TIME | ALTITUDE | LONGITUDE | LATITUDE | GROUND SPEED |
|---|---|---|---|---|
| | | | | |
| 256 | 24150 | 56.2541 | 45.0055 | 205 |
| 257 | 24150 | 56.2550 | 45.0053 | 205 |
| 258 | 24150 | 56.2559 | 45.0050 | 205 |
| 259 | 24150 | 56.2569 | 45.0048 | 205 |

*FIG. 4*

| TIME | AERODYNAMIC FLIGHT PATH ANGLE | AERODYNAMIC BEARING | MACH |
|---|---|---|---|
| | | | |
| 128 | -5.11 | 73.19 | 0.610 |
| 129 | -5.11 | 73.19 | 0.610 |
| 130 | -5.11 | 73.19 | 0.610 |
| 131 | -5.11 | 73.19 | 0.610 |

*FIG. 5*

SECURE TRANSMISSION OF AN AIRCRAFT TRAJECTORY

PRIORITY STATEMENT

This application claims the benefit of EP Patent Application No. 13382043.1, filed on Feb. 13, 2013 in the Spanish Patent Office, the disclosure of which is incorporated herein by reference in its entirety.

FIELD

The present disclosure relates to the secure transmission of an aircraft trajectory that is to be flown or that has been flown. Methods and computer infrastructures are provided that allow encryption and decryption of a description of an aircraft trajectory.

BACKGROUND

Knowledge of an aircraft's trajectory, whether that be planned or already executed, is useful for a number of reasons. Moreover, it is often useful to be able to share knowledge of an aircraft's trajectory, although there is sometimes a need for knowledge of that trajectory to remain confidential between trusted parties.

By trajectory, an unambiguous four-dimensional description of the aircraft's path is meant. The trajectory description may be the evolution of the aircraft's state with time, where the state may include the position of the aircraft (e.g. the position of the aircraft's centre of mass) and, optionally, the evolution of other aspects of its motion such as velocity, attitude and weight. Thus, the trajectory may be represented as an indication of each of these typical aircraft states at consecutive points in time during the flight.

Methods exist that allow aircraft trajectories to be calculated from aircraft intent. Aircraft intent is a description of how the aircraft is to be flown, for example expressed as instructions using a formal language. The description provides a complete description of the aircraft's behaviour such that all degrees of freedom of motion are defined and such that a unique trajectory may be calculated unambiguously from the description. The trajectory may be calculated using a trajectory computation infrastructure that, in addition to the aircraft intent data, uses a description of the aircraft performance and a description of the atmospheric conditions as further inputs. Co-pending U.S. patent application Ser. No. 12/679,275 published as US 2010-0305781 A1, also in the name of The Boeing Company, describes aircraft intent and trajectory computation in more detail, and the disclosure of this application is incorporated herein in its entirety by reference.

Aircraft intent allows an aircraft's trajectory to be predicted unambiguously by solving a set of differential equations that model both aircraft behaviour and atmospheric conditions. The aircraft intent may be derived from flight intent, as follows. Flight intent may be thought of as a generalisation of the concept of a flight plan, and so will reflect operational constraints and objectives such as intended or required route and operator preferences. Generally, flight intent will not unambiguously define an aircraft's trajectory, as the information it contains need not close all degrees of freedom of the aircraft's motion. Put another way, there are likely to be many aircraft trajectories that would satisfy a given flight intent. Thus, flight intent may be regarded as a basic blueprint for a flight, but that lacks the specific details required to compute unambiguously a trajectory.

For example, the instructions to be followed during a standard terminal arrival route (STAR) or a standard instrument departure (SID) would correspond to an example of flight intent. In addition, airline preferences may also form an example of flight intent. To determine aircraft intent, instances of flight intent like a SID procedure, the airline's operational preferences and the actual pilot's decision making process are combined. This is because the aircraft intent comprises a structured set of instructions that are used by a trajectory computation infrastructure to provide an unambiguous trajectory. The instructions should include configuration details of the aircraft (e.g. landing gear deployment), and procedures to be followed during manoeuvres and normal flight (e.g. track a certain turn radius or hold a given airspeed). These instructions capture the basic commands and guidance modes at the disposal of the pilot and the aircraft's flight management system to direct the operation of the aircraft. Thus, aircraft intent may be thought of as an abstraction of the way in which an aircraft is commanded to behave by the pilot and/or flight management system.

Aircraft intent is expressed using a set of parameters presented so as to allow equations of motion to be solved. These parameters may be ground-referenced or air-referenced parameters or a combination of both. The theory of formal languages may be used to implement this formulation: an aircraft intent description language provides the set of instructions and the rules that govern the allowable combinations that express the aircraft intent, and so allow a prediction of the aircraft trajectory.

Aircraft intent is especially useful in planning flights and missions of aircraft. Expressing aircraft intent using formal languages provides a common platform for the exchange of flight information and allows different interested parties to perform trajectory calculations. Thus, this method lends itself to collaborations where two or more parties require access to a planned trajectory. However, there are situations where details of a planned trajectory should remain confidential. In this sense, aircraft intent can be disadvantageous as, if aircraft intent data were to be intercepted by an undesirable third party, that party could determine unambiguously the planned trajectory from the intercepted aircraft intent data.

Thus there is a need for the secure transmission of a description of an aircraft trajectory. In particular, methods that make use of existing infrastructure would be particularly beneficial.

SUMMARY

Against this background and according to a first aspect, the present disclosure resides in a computer-implemented method of communicating securely an aircraft trajectory using encryption and decryption of a description of the aircraft trajectory. As noted above, the trajectory is a four-dimensional description of the flight path of the aircraft, e.g. the flight path defined over a period of time, for example by specifying the flight path over a series of points in time.

On the sender's side, the method comprises obtaining a ground-referenced description of the trajectory of the aircraft expressed in ground-referenced parameters along with a description of an imaginary atmospheric model describing imaginary atmospheric conditions along the trajectory. These will be imaginary atmospheric conditions that the aircraft is simulated to experience as it flies the trajectory.

The method then comprises using the description of the imaginary atmospheric model to encrypt the ground-referenced description of the aircraft trajectory by converting the ground-referenced description of the aircraft trajectory into an air-referenced description of the aircraft trajectory expressed in air-referenced parameters with respect to the imaginary atmospheric model.

As an imaginary atmospheric model is used, the simulated flight will follow a trajectory that is not the same as the real ground-referenced trajectory. This method may be practiced before or after the flight has taken place. For example, the methods may be used to encrypt the proposed trajectory of a planned flight or it may be practiced after the flight has taken place. In the former example, a proposed trajectory may be communicated during a review process. Alternatively, a trajectory may be sent to an aircraft. For example, an airline may send a flight plan to a pilot on an aircraft or a commander may send a mission plan to an unmanned air vehicle. Where the flight has already taken place, the trajectory may be shared as part of a reporting process.

Still on the sender's side, the method may further comprise making available to the receiver the description of the imaginary atmospheric conditions and air-referenced data from which the aircraft trajectory may be unambiguously determined. This data may simply correspond to the air-referenced description of the aircraft trajectory, but could also comprise a conversion of the air-referenced description of the aircraft trajectory into air-referenced aircraft intent data. This step of making available the data may comprise the sender sending the descriptions or the receiver retrieving the descriptions. The transfer of the descriptions from sender to receiver may be direct or indirect. The transfer may be affected differently for the two descriptions. In fact, preferably the description of the imaginary atmospheric conditions and the air-referenced description of the aircraft trajectory are passed separately from sender to receiver. For example, the transfers may occur at different times and/or using different means of communication.

On the receiver's side, the method comprises receiving the description of the imaginary atmospheric conditions and the air-referenced data from which the aircraft trajectory may be unambiguously determined. The description of the imaginary atmospheric conditions are used to decrypt air-referenced data from which the aircraft trajectory may be unambiguously determined by converting the air-referenced data from which the aircraft trajectory may be unambiguously determined back into the ground-referenced description of the aircraft trajectory expressed in ground-referenced parameters.

Hence, an effective form of encryption is realised where the ground-referenced description of the aircraft trajectory is the plain text, and the description of the imaginary atmospheric conditions is the cipher key. The air-referenced description of the aircraft trajectory or the corresponding air-referenced aircraft intent data is the cipher text that may only be decrypted to reveal the true ground-referenced description of the aircraft trajectory if the correct cipher key is known.

As noted above, the air-referenced data from which the aircraft trajectory may be unambiguously determined may comprise air-referenced aircraft intent data that provides a description of aircraft intent of the aircraft expressed in air-referenced parameters corresponding to a computer language description expressed using a formal language. The description of the aircraft intent is a description of how the aircraft is to be flown expressed as instructions that provides a complete description of the aircraft's behaviour such that all degrees of freedom of motion are defined and such that a unique trajectory may be calculated unambiguously from the description of aircraft intent. The method may comprise using the air-referenced description of the aircraft trajectory, the description of the imaginary atmospheric model and an aircraft performance model that describes how the aircraft performs to generate the air-referenced aircraft intent data.

Optionally, the ground-referenced description of the aircraft trajectory and/or the air-referenced description of the aircraft trajectory comprises one or more computer data files representing a time-evolving series of either ground-referenced or air-referenced parameters respectively. For the ground-referenced description of the aircraft trajectory, the ground-referenced parameters may comprise any of longitude, latitude, altitude, ground speed, bearing and direction. For the air-referenced description of the aircraft trajectory, the air-referenced parameters may comprise any of air speed, Mach, aerodynamic bearing, and aerodynamic flight path angle.

Optionally, on the sender side, the method further comprises obtaining a description of aircraft intent of the aircraft. The aircraft intent corresponds to a computer-language description, optionally expressed using a formal language, of how the aircraft is to be flown or was flown. The description may be expressed as a set of instructions that provides a complete description of the aircraft's behaviour such that all degrees of freedom of motion are defined and such that a unique trajectory may be calculated unambiguously from the description of aircraft intent.

The method may further comprise obtaining a description of a real atmospheric model describing real atmospheric conditions along the trajectory. These real atmospheric conditions may correspond to the actual atmospheric conditions experienced when the flight was made (if the flight has already occurred), or may correspond to predicted weather conditions forecast to exist along the trajectory. The method may then comprise using the description of the real atmospheric conditions to provide the ground-referenced description of the aircraft trajectory expressed in ground-referenced parameters from the description of the aircraft intent.

The present disclosure has particular benefit when used in systems that employ aircraft intent. As explained in the introduction, existing systems include trajectory computation infrastructures that are already in place to convert aircraft intent into corresponding descriptions of trajectories, for example using trajectory computation engines. This existing infrastructure may be employed with the present disclosure: the difference is that the trajectory computation engine is provided with a synthesised atmospheric model rather that a real atmospheric model, but otherwise may operate in the same way. Hence use may be made of existing facilities and so the cost of implementation is much reduced.

In the above method, after conversion of the description of aircraft intent into the ground-referenced description of the aircraft trajectory, the method may comprise providing a graphical display of the aircraft trajectory.

Optionally, on the sender side, the method may further comprise obtaining an aircraft performance model that describes how the aircraft performs, and using the aircraft performance model and the description of the real atmospheric conditions to generate the ground-referenced description of the aircraft trajectory expressed in the ground-referenced parameters from the description of the aircraft intent.

The imaginary atmospheric conditions may be generated in many different ways. For example, the method may comprise generating randomly the imaginary atmospheric conditions. Alternatively, the method may comprise obtaining a description of a real atmospheric model that describes real atmospheric conditions along the trajectory. This real model may comprise the actual atmospheric conditions experienced when the flight was made (if the flight has already occurred), or may correspond to predicted weather conditions forecast to exist along the trajectory. The real atmospheric conditions may be altered to form the imaginary atmospheric conditions, for example by randomly varying parameters contained in the description.

Optionally, the method may comprise including in the air-referenced data from which the aircraft trajectory may be unambiguously determined, a ground-referenced position of the aircraft. This may be the only ground-referenced parameter in the air-referenced data from which the aircraft trajectory may be unambiguously determined. Optionally, the position is a ground-referenced initial position of the aircraft. This may be necessary, for example, where the air-referenced parameters provide heading, flight path angle and air speed but that still requires a reference to a ground position to allow the aircraft to be located relative to the atmospheric conditions. For example, specifying the aircraft's initial position allows that first position to be related to the atmospheric conditions at that position at the start time. From that point forward, dead reckoning will allow the aircraft's flight path to be determined in conjunction with the imaginary atmospheric conditions at each successive point in time.

The method may further comprise, on the receiver side, generating a graphical display of the trajectory.

The method may further comprise, on the receiver side, obtaining a description of a real atmospheric model describing real atmospheric condition along the trajectory, obtaining an aircraft performance model that describes how the aircraft performs, and using the description of the real atmospheric model and the aircraft performance remodel to convert the ground-referenced description of the aircraft trajectory into a description of aircraft intent corresponding to a computer-language description expressed using a formal language. The description of the aircraft intent is a description of how the aircraft is to be flown expressed as instructions that provides a complete description of the aircraft's behaviour such that all degrees of freedom of motion are defined. The method may then further comprise using the description of aircraft intent to fly the aircraft. For example the method may comprise a commander acting as the sender and sending the air-referenced description of the aircraft trajectory to a receiver comprising an unmanned air vehicle.

From a second aspect, the present disclosure resides in a computer-implemented method of encrypting a description of an aircraft trajectory. The method comprises obtaining a ground-referenced description of the trajectory of the aircraft expressed in ground-referenced parameters, and obtaining a description of an imaginary atmospheric model describing imaginary atmospheric conditions along the trajectory. The method further comprises using the description of the imaginary atmospheric model to encrypt the ground-referenced description of the aircraft trajectory by converting the ground-referenced description of the aircraft trajectory into an air-referenced description of the aircraft trajectory expressed in air-referenced parameters with respect to the imaginary atmospheric model.

As noted above, the trajectory is a four-dimensional description of the flight path of the aircraft, e.g. the flight path defined over a period of time, for example by specifying the flight path over a series of points in time.

The imaginary atmospheric conditions along the trajectory will be imaginary atmospheric conditions that the aircraft is simulated to experience as it flies the trajectory.

This method may be practiced before or after the flight has taken place. For example, the methods may be used to encrypt the proposed trajectory of a planned flight or it may be practiced after the flight has taken place.

Optionally, the ground-referenced description of the aircraft trajectory and/or the air-referenced description of the aircraft trajectory comprises one or more computer data files representing a time-evolving series of either ground-referenced or air-referenced parameters respectively. For the ground-referenced description of the aircraft trajectory, the ground-referenced parameters may comprise any of longitude, latitude, altitude, ground speed, bearing and direction. For the air-referenced description of the aircraft trajectory, the air-referenced parameters may comprise any of air speed, Mach, aerodynamic bearing, and aerodynamic flight path angle.

Optionally, the method further comprises obtaining a description of aircraft intent of the aircraft. The aircraft intent corresponds to a computer-language description, optionally expressed using a formal language, of how the aircraft is to be flown or was flown. The description may be expressed as a set of instructions that provides a complete description of the aircraft's behaviour such that all degrees of freedom of motion are defined and such that a unique trajectory may be calculated unambiguously from the description of aircraft intent.

The method may further comprise obtaining a description of a real atmospheric model describing real atmospheric conditions along the trajectory. These real atmospheric conditions may correspond to the actual atmospheric conditions experienced when the flight was made (if the flight has already occurred), or may correspond to predicted weather conditions forecast to exist along the trajectory. The method may then comprise using the description of the real atmospheric conditions to provide the ground-referenced description of the aircraft trajectory expressed in ground-referenced parameters from the description of the aircraft intent.

The present disclosure has particular benefit when used in systems that employ aircraft intent. As explained in the introduction, existing systems include trajectory computation infrastructures that are already in place to convert aircraft intent into corresponding descriptions of trajectories, for example using trajectory computation engines. This existing infrastructure may be employed with the present disclosure: the difference is that the trajectory computation engine is provided with a synthesised atmospheric model rather that a real atmospheric model, but otherwise may operate in the same way. Hence use may be made of existing facilities and so the cost of implementation is much reduced.

In the above method, after conversion of the description of aircraft intent into the ground-referenced description of the aircraft trajectory, the method may comprise providing a graphical display of the aircraft trajectory.

Optionally, the method may further comprise obtaining an aircraft performance model that describes how the aircraft performs, and using the aircraft performance model and the description of the real atmospheric conditions to generate the ground-referenced description of the aircraft trajectory expressed in the ground-referenced parameters from the description of the aircraft intent.

The imaginary atmospheric conditions may be generated in many different ways. For example, the method may comprise generating randomly the imaginary atmospheric conditions. Alternatively, the method may comprise obtaining a description of a real atmospheric model that describes real atmospheric conditions along the trajectory. This real model may comprise the actual atmospheric conditions experienced when the flight was made (if the flight has already occurred), or may correspond to predicted weather conditions forecast to exist along the trajectory. The real atmospheric conditions may be altered to form the imaginary atmospheric conditions, for example by randomly varying parameters contained in the description.

Optionally, the method may comprise including in the air-referenced description of the aircraft trajectory, a ground-referenced position of the aircraft. This may be the only ground-referenced parameter in the air-referenced description of the aircraft trajectory. Optionally, the position is a ground-referenced initial position of the aircraft. This may be necessary, for example, where the air-referenced parameters provide heading, flight path angle and air speed but that still requires a reference to a ground position to allow the aircraft to be located relative to the atmospheric conditions. For example, specifying the aircraft's initial position allows that first position to be related to the atmospheric conditions at that position at the start time. From that point forward, dead reckoning will allow the aircraft's flight path to be determined in conjunction with the imaginary atmospheric conditions at each successive point in time.

The method may further comprise converting the air-referenced description of the aircraft trajectory into air-referenced aircraft intent data that provides a description of aircraft intent of the aircraft expressed in air-referenced parameters corresponding to a computer language description expressed using a formal language. The description of the aircraft intent is a description of how the aircraft is to be flown expressed as instructions that provides a complete description of the aircraft's behaviour such that all degrees of freedom of motion are defined and such that a unique trajectory may be calculated unambiguously from the description of aircraft intent. The method may comprise using the air-referenced description of the aircraft trajectory, the description of the imaginary atmospheric model and an aircraft performance model that describes how the aircraft performs to generate the air-referenced aircraft intent data.

From a third aspect, the present disclosure resides in a computer-implemented method of decrypting a description of an aircraft trajectory. The method further comprises obtaining an encrypted description of a trajectory corresponding to an air-referenced description of the aircraft trajectory expressed in air-referenced parameters with respect to an imaginary atmospheric model describing imaginary atmospheric conditions along the trajectory. The method further comprises obtaining a description of the imaginary atmospheric model used during the encryption that produced the air-referenced description of the aircraft trajectory. Then, the method further comprises using the description of the imaginary atmospheric conditions to decrypt the air-referenced description of the aircraft trajectory by converting the air-referenced description of the aircraft trajectory into a ground-referenced description of the aircraft trajectory expressed in ground-referenced parameters.

From a fourth aspect, the present disclosure resides in a computer-implemented method of decrypting air-referenced aircraft intent data. The method comprises obtaining air-referenced aircraft intent data that provides a description of aircraft intent of an aircraft expressed in air-referenced parameters corresponding to a computer language description expressed using a formal language. The description of the aircraft intent is a description of how the aircraft is to be flown expressed as instructions that provides a complete description of the aircraft's behaviour such that all degrees of freedom of motion are defined and such that a unique trajectory may be calculated unambiguously from the description of aircraft intent, and wherein the air-referenced aircraft intent data is expressed in air-referenced parameters with respect to an imaginary atmospheric model describing imaginary atmospheric conditions along the trajectory. The method further comprises obtaining a description of the imaginary atmospheric model used during the encryption that produced the air-referenced data from which the aircraft trajectory may be unambiguously determined, and obtaining an aircraft performance model that describes how the aircraft performs. The method then further comprises using the description of the imaginary atmospheric conditions and the aircraft performance model to decrypt the air-referenced aircraft intent data by converting the air-referenced aircraft intent data into a ground-referenced description of the aircraft trajectory expressed in ground-referenced parameters.

The method of either of the two preceding paragraphs may be practiced before or after the flight has taken place. For example, either method may be used to encrypt the proposed trajectory of a planned flight or it may be practiced after the flight has taken place. In the former example, a proposed trajectory may be required during a review process. Alternatively, an encrypted trajectory may be sent to an aircraft that must be decrypted by the aircraft. For example, an airline may send a flight plan to a pilot on an aircraft or a commander may send a mission plan to an unmanned air vehicle. Where the flight has already taken place, the trajectory may be shared as part of a reporting process.

Optionally, the ground-referenced description of the aircraft trajectory and/or the air-referenced description of the aircraft trajectory comprises one or more computer data files representing a time-evolving series of either ground-referenced or air-referenced parameters respectively. For the ground-referenced description of the aircraft trajectory, the ground-referenced parameters may comprise any of longitude, latitude, altitude, ground speed, bearing and direction. For the air-referenced description of the aircraft trajectory, the air-referenced parameters may comprise any of air speed, Mach, aerodynamic bearing, and aerodynamic flight path angle.

Either method may further comprise, generating a graphical display of the trajectory.

Either method may further comprise converting the ground-referenced description of the aircraft trajectory into a description of aircraft intent corresponding to a computer-language description expressed using a formal language. The description of the aircraft intent is a description of how the aircraft is to be flown expressed as instructions that provides a complete description of the aircraft's behaviour such that all degrees of freedom of motion are defined. In order to do this, the method may further comprise obtaining an aircraft performance model that describes how the aircraft performs. The method may further comprise obtaining a description of a real atmospheric model describing real atmospheric conditions along the trajectory. These real atmospheric conditions may correspond to the actual atmospheric conditions experienced when the flight was made (if the flight has already occurred), or may correspond to predicted weather conditions forecast to exist along the trajectory. The method may then further comprise using the aircraft performance model and the description of the real atmospheric model to generate the description of the aircraft intent.

The present disclosure has particular benefit when used in systems that employ aircraft intent. As explained in the introduction, existing systems include trajectory computation infrastructures that are already in place to convert aircraft intent into corresponding descriptions of trajectories, for example using trajectory computation engines. This existing infrastructure may be employed with the present disclosure to generate the aircraft intent.

The present disclosure also extends to a computer program that when executed on a computer system, will cause the computer system to perform any of the methods described above, and to a computer program product having stored thereon such a computer program.

From a fifth aspect, the present disclosure resides in a computer infrastructure operable to communicate securely an aircraft trajectory using encryption and decryption of a description of the aircraft trajectory, comprising an encryption computer system and a decryption computer system.

The encryption computer system comprises memory operable to store a ground-referenced description of the trajectory of the aircraft expressed in ground-referenced parameters. The same memory is operable to store a description of an imaginary atmospheric model describing imaginary atmospheric conditions along the trajectory, or the encryption computer system comprises further memory for this purpose.

The encryption computer system further comprises an encryption processor programmed to use the description of the imaginary atmospheric model to encrypt the ground-referenced description of the aircraft trajectory by converting the ground-referenced description of the aircraft trajectory into an air-referenced description of the aircraft trajectory expressed in air-referenced parameters with respect to the imaginary atmospheric model, and to make available to the decryption computer system the description of the imaginary atmospheric conditions and air-referenced data from which the aircraft trajectory may be unambiguously determined. This data may simply correspond to the air-referenced description of the aircraft trajectory, but could also comprise a conversion of the air-referenced description of the aircraft trajectory into air-referenced aircraft intent data.

The decryption computer system comprises a receiver operable to receive the description of the imaginary atmospheric conditions and the air-referenced data from which the aircraft trajectory may be unambiguously determined and memory operable to store these descriptions. The decryption computer system further comprises a decryption processor programmed to use the description of the imaginary atmospheric conditions to decrypt the air-referenced data from which the aircraft trajectory may be unambiguously determined by converting the air-referenced data from which the aircraft trajectory may be unambiguously determined back into the ground-referenced description of the aircraft trajectory expressed in ground-referenced parameters.

The encryption processor may comprise a collection of multiple individual processors, as too may the decryption processor.

As noted above, the trajectory is a four-dimensional description of the flight path of the aircraft, e.g. the flight path defined over a period of time, for example by specifying the flight path over a series of points in time.

The imaginary atmospheric conditions will be imaginary atmospheric conditions that the aircraft is simulated to experience as it flies the trajectory. As an imaginary atmospheric model is used, the simulated flight will follow a trajectory that is not the same as the real ground-referenced trajectory. This encryption and decryption may occur before or after the flight has taken place. For example, the proposed trajectory of a planned flight may be encrypted or an actual trajectory may be encrypted after the flight has taken place. In the former example, a proposed trajectory may be communicated during a review process. Alternatively, a trajectory may be sent to an aircraft. For example, an airline may send a flight plan to a pilot on an aircraft or a commander may send a mission plan to an unmanned air vehicle. Where the flight has already taken place, the trajectory may be shared as part of a reporting process.

The transfer of the descriptions from the encryption computer system to the decryption computer system may be direct or indirect. The transfer may be affected differently for the two descriptions. In fact, preferably the description of the imaginary atmospheric conditions and the air-referenced description of the aircraft trajectory are passed separately from the encryption computer system to the decryption computer system. For example, the transfers may occur at different times and/or using different channels.

Hence, an effective form of encryption is realised where the ground-referenced description of the aircraft trajectory is the plain text, and the description of the imaginary atmospheric conditions is the cipher key. The air-referenced description of the aircraft trajectory or the corresponding air-referenced aircraft intent data is the cipher text that may only be decrypted to reveal the true ground-referenced description of the aircraft trajectory if the correct cipher key is known.

As noted above, the air-referenced data from which the aircraft trajectory may be unambiguously determined may comprise air-referenced aircraft intent data that provides a description of aircraft intent of the aircraft expressed in air-referenced parameters corresponding to a computer language description expressed using a formal language. The description of the aircraft intent is a description of how the aircraft is to be flown expressed as instructions that provides a complete description of the aircraft's behaviour such that all degrees of freedom of motion are defined and such that a unique trajectory may be calculated unambiguously from the description of aircraft intent. The encryption computer system may use the air-referenced description of the aircraft trajectory, the description of the imaginary atmospheric model and an aircraft performance model that describes how the aircraft performs to generate the air-referenced aircraft intent data.

Optionally, the computer infrastructure is operable to produce the ground-referenced description of the aircraft trajectory and/or the air-referenced description of the aircraft trajectory as one or more computer data files representing a time-evolving series of either ground-referenced or air-referenced parameters respectively. For the ground-referenced description of the aircraft trajectory, the ground-referenced parameters may comprise any of longitude, latitude, altitude, ground speed, bearing and direction. For the air-referenced description of the aircraft trajectory, the air-referenced parameters may comprise any of air speed, Mach, aerodynamic bearing, and aerodynamic flight path angle.

Optionally, the encryption computer system may further comprise memory to store a description of aircraft intent of the aircraft. The aircraft intent corresponds to a computer language description, optionally expressed using a formal language, of how the aircraft is to be flown or was flown. The description may be expressed as a set of instructions that provides a complete description of the aircraft's behaviour such that all degrees of freedom of motion are defined and such that a unique trajectory may be calculated unambiguously from the description of aircraft intent.

The encryption computer system may further comprise memory operable to store a description of a real atmospheric model describing real atmospheric conditions along the trajectory. These real atmospheric conditions may correspond to the actual atmospheric conditions experienced when the flight was made (if the flight has already occurred), or may correspond to predicted weather conditions forecast to exist along the trajectory.

The encryption processor may be further programmed to use the description of the real atmospheric conditions to provide the ground-referenced description of the aircraft trajectory expressed in ground-referenced parameters from the description of the aircraft intent.

The present disclosure has particular benefit when used in computer infrastructures that employ aircraft intent. As explained in the introduction, existing systems include trajectory computation infrastructures that are already in place to convert aircraft intent into corresponding descriptions of trajectories, for example using trajectory computation engines. This existing infrastructure may be employed with the present disclosure: the difference is that the trajectory computation engine is provided with a synthesised atmospheric model rather that a real atmospheric model, but otherwise may operate in the same way. Hence use may be made of existing facilities and so the cost of implementation is much reduced. Hence, the computer infrastructure may comprise a trajectory computation infrastructure as part of the encryption computer system and/or as part of the decryption computer system. Optionally, the trajectory computation infrastructure may comprise a trajectory computation engine.

After conversion of the description of aircraft intent into the ground-referenced description of the aircraft trajectory, the encryption processor may be programmed to provide a graphical display of the aircraft trajectory.

Optionally, the encryption computer system may further comprise memory operable to store an aircraft performance model that describes how the aircraft performs. The encryption processor may be programmed to use the aircraft performance model and the description of the real atmospheric conditions to generate the ground-referenced description of the aircraft trajectory expressed in the ground-referenced parameters from the description of the aircraft intent.

The imaginary atmospheric conditions may be generated in many different ways. For example, the computer infrastructure may be operable to generate randomly the imaginary atmospheric conditions. Alternatively, the computer infrastructure may be operable to obtain a description of a real atmospheric model that describes real atmospheric conditions along the trajectory and to alter those real conditions to form the imaginary atmospheric conditions, for example by randomly varying parameters contained in the description. The real model may comprise the actual atmospheric conditions experienced when the flight was made (if the flight has already occurred), or may correspond to predicted weather conditions forecast to exist along the trajectory.

Optionally, the encryption processor may be programmed to include in the air-referenced data from which the aircraft trajectory may be unambiguously determined, a ground-referenced position of the aircraft. This may be the only ground-referenced parameter in the air-referenced data from which the aircraft trajectory may be unambiguously determined. Optionally, the position is a ground-referenced initial position of the aircraft. This may be necessary, for example, where the air-referenced parameters provide heading, flight path angle and air speed but that still requires a reference to a ground position to allow the aircraft to be located relative to the atmospheric conditions. For example, specifying the aircraft's initial position allows that first position to be related to the atmospheric conditions at that position at the start time. From that point forward, dead reckoning will allow the aircraft's flight path to be determined in conjunction with the imaginary atmospheric conditions at each successive point in time.

The decryption processor may be programmed to generate a graphical display of the trajectory.

The decryption processor may be programmed to convert the ground-referenced description of the aircraft trajectory into a description of aircraft intent corresponding to a computer-language description expressed using a formal language. The description of the aircraft intent is a description of how the aircraft is to be flown expressed as instructions that provides a complete description of the aircraft's behaviour such that all degrees of freedom of motion are defined. The decryption computer system may be operable to supply the description of aircraft intent to allow the aircraft to fly the trajectory. For example, the decryption computer system may be provided on an aircraft, and the aircraft intent may be provided to another computer responsible for flying the aircraft (such as an autopilot). The aircraft may be an unmanned air vehicle.

From a sixth aspect, the present disclosure resides in a computer system operable to encrypt a description of an aircraft trajectory. The computer system comprises memory operable to store a ground-referenced description of the trajectory of the aircraft expressed in ground-referenced parameters. This memory may be further operable to store a description of an imaginary atmospheric model describing imaginary atmospheric conditions along the trajectory. Alternatively, the computer system may comprise further memory for this purpose.

The computer system may further comprise a processor programmed to use the description of the imaginary atmospheric model to encrypt the ground-referenced description of the aircraft trajectory by converting the ground-referenced description of the aircraft trajectory into an air-referenced description of the aircraft trajectory expressed in air-referenced parameters with respect to the imaginary atmospheric model.

The encryption processor may comprise a collection of multiple individual processors. The computer system may be distributed, and may be connected by a computer network.

As noted above, the trajectory is a four-dimensional description of the flight path of the aircraft, e.g. the flight path defined over a period of time, for example by specifying the flight path over a series of points in time.

The imaginary atmospheric conditions along the trajectory will be imaginary atmospheric conditions that the aircraft is simulated to experience as it flies the trajectory.

The encryption may occur before or after the flight has taken place. For example, encryption may be of the proposed trajectory of a planned flight or it may encryption of an actual trajectory after a flight has taken place.

Optionally, the ground-referenced description of the aircraft trajectory and/or the air-referenced description of the aircraft trajectory comprises one or more computer data files representing a time-evolving series of either ground-referenced or air-referenced parameters respectively. For the ground-referenced description of the aircraft trajectory, the ground-referenced parameters may comprise any of longitude, latitude, altitude, ground speed, bearing and direction. For the air-referenced description of the aircraft trajectory, the air-referenced parameters may comprise any of air speed, Mach, aerodynamic bearing, and aerodynamic flight path angle.

Optionally, the computer system may further comprise memory operable to store a description of aircraft intent of the aircraft. The aircraft intent corresponds to a computer language-description, optionally expressed using a formal language, of how the aircraft is to be flown or was flown. The description may be expressed as a set of instructions that provides a complete description of the aircraft's behaviour such that all degrees of freedom of motion are defined and such that a unique trajectory may be calculated unambiguously from the description of aircraft intent.

The computer system may further comprise memory operable to store a description of a real atmospheric model describing real atmospheric conditions along the trajectory. These real atmospheric conditions may correspond to the actual atmospheric conditions experienced when the flight was made (if the flight has already occurred), or may correspond to predicted weather conditions forecast to exist along the trajectory. The processor may be programmed to use the description of the real atmospheric conditions to provide the ground-referenced description of the aircraft trajectory expressed in ground-referenced parameters from the description of the aircraft intent.

The present disclosure has particular benefit when used in systems that employ aircraft intent. As explained in the introduction, existing systems include trajectory computation infrastructures that are already in place to convert aircraft intent into corresponding descriptions of trajectories, for example using trajectory computation engines. This existing infrastructure may be employed with the present disclosure: the difference is that the trajectory computation engine is provided with a synthesised atmospheric model rather that a real atmospheric model, but otherwise may operate in the same way. Hence use may be made of existing facilities and so the cost of implementation is much reduced. Hence, the computer system may comprise a trajectory computation infrastructure and, optionally a trajectory computation engine.

After conversion of the description of aircraft intent into the ground-referenced description of the aircraft trajectory, the processor may be programmed to provide a graphical display of the aircraft trajectory.

The computer system may comprise memory operable to store an aircraft performance model that describes how the aircraft performs. The processor may be programmed to use the aircraft performance model and the description of the real atmospheric conditions to generate the ground-referenced description of the aircraft trajectory expressed in the ground-referenced parameters from the description of the aircraft intent.

The imaginary atmospheric conditions may be generated in many different ways. For example, the computer system may be operable to generate randomly the imaginary atmospheric conditions. Alternatively, the computer system may be operable to obtain a description of a real atmospheric model that describes real atmospheric conditions along the trajectory. This real model may comprise the actual atmospheric conditions experienced when the flight was made (if the flight has already occurred), or may correspond to predicted weather conditions forecast to exist along the trajectory. The processor may be programmed to alter the real atmospheric conditions to form the imaginary atmospheric conditions, for example by randomly varying parameters contained in the description.

Optionally, the processor may be programmed to include in the air-referenced description of the aircraft trajectory, a ground-referenced position of the aircraft. This may be the only ground-referenced parameter in the air-referenced description of the aircraft trajectory. Optionally, the position is a ground-referenced initial position of the aircraft. This may be necessary, for example, where the air-referenced parameters provide heading, flight path angle and air speed but that still requires a reference to a ground position to allow the aircraft to be located relative to the atmospheric conditions. For example, specifying the aircraft's initial position allows that first position to be related to the atmospheric conditions at that position at the start time. From that point forward, dead reckoning will allow the aircraft's flight path to be determined in conjunction with the imaginary atmospheric conditions at each successive point in time.

As noted above, the air-referenced data from which the aircraft trajectory may be unambiguously determined may comprise air-referenced aircraft intent data that provides a description of aircraft intent of the aircraft expressed in air-referenced parameters corresponding to a computer language description expressed using a formal language. The description of the aircraft intent is a description of how the aircraft is to be flown expressed as instructions that provides a complete description of the aircraft's behaviour such that all degrees of freedom of motion are defined and such that a unique trajectory may be calculated unambiguously from the description of aircraft intent. The computer system may use the air-referenced description of the aircraft trajectory, the description of the imaginary atmospheric model and an aircraft performance model that describes how the aircraft performs to generate the air-referenced aircraft intent data.

From a seventh aspect, the present disclosure resides in a computer system operable to decrypt a description of an aircraft trajectory. The computer system comprises memory to store an encrypted description of a trajectory corresponding to an air-referenced description of the aircraft trajectory expressed in air-referenced parameters with respect to an imaginary atmospheric model describing imaginary atmospheric conditions along the trajectory. The memory may be further operable to store a description of the imaginary atmospheric model used during the encryption that produced the air-referenced description of the aircraft trajectory. Alternatively, the computer system may comprise further memory for this purpose. The computer system may further comprise a processor programmed to use the description of the imaginary atmospheric conditions to decrypt the air-referenced description of the aircraft trajectory by converting the air-referenced description of the aircraft trajectory into a ground-referenced description of the aircraft trajectory expressed in ground-referenced parameters.

From an eighth aspect, the present disclosure resides in a computer system operable to decrypt air-referenced aircraft intent data. The computer system comprises memory operable to store air-referenced aircraft intent data that provides a description of aircraft intent of an aircraft expressed in air-referenced parameters corresponding to a computer language description expressed using a formal language, wherein the description of the aircraft intent is a description of how the aircraft is to be flown expressed as instructions that provides a complete description of the aircraft's behaviour such that all degrees of freedom of motion are defined and such that a unique trajectory may be calculated unambiguously from the description of aircraft intent, and wherein the air-referenced aircraft intent data is expressed in air-referenced parameters with respect to an imaginary atmospheric model describing imaginary atmospheric conditions along the trajectory. The computer system further comprises memory operable to store a description of the imaginary atmospheric model used during the encryption that produced the air-referenced description of the aircraft trajectory, and memory operable to store an aircraft performance model that describes how the aircraft performs. The memories may be separate or shared. The computer system further comprises a processor programmed to use the description of the imaginary atmospheric conditions and the aircraft performance model to decrypt the air-referenced the aircraft intent into a ground-referenced description of the aircraft trajectory expressed in ground-referenced parameters.

The decryption processor of either of the two preceding paragraphs may comprise a collection of multiple individual processors. The computer system may be distributed, and may be connected by a computer network.

As noted above, the trajectory is a four-dimensional description of the flight path of the aircraft, e.g. the flight path defined over a period of time, for example by specifying the flight path over a series of points in time.

The decryption may be practiced before or after the flight has taken place. For example, the decryption may be of the proposed trajectory of a planned flight or it may be of an actual trajectory after a flight has taken place. In the former example, a proposed trajectory may be required during a review process. Alternatively, an encrypted trajectory may be sent to an aircraft that must be decrypted by the aircraft. For example, an airline may send a flight plan to a pilot on an aircraft or a commander may send a mission plan to an unmanned air vehicle. Where the flight has already taken place, the trajectory may be shared as part of a reporting process.

Optionally, the ground-referenced description of the aircraft trajectory and/or the air-referenced description of the aircraft trajectory comprises one or more computer data files representing a time-evolving series of either ground-referenced or air-referenced parameters respectively. For the ground-referenced description of the aircraft trajectory, the ground-referenced parameters may comprise any of longitude, latitude, altitude, ground speed, bearing and direction. For the air-referenced description of the aircraft trajectory, the air-referenced parameters may comprise any of air speed, Mach, aerodynamic bearing, and aerodynamic flight path angle.

Either of the above processors may be programmed to generate a graphical display of the trajectory.

Either processor may be programmed to convert the ground-referenced description of the aircraft trajectory into a description of aircraft intent corresponding to a computer-language description expressed using a formal language. The description of the aircraft intent is a description of how the aircraft is to be flown expressed as instructions that provides a complete description of the aircraft's behaviour such that all degrees of freedom of motion are defined. In order to do this, the computer system may comprise memory operable to store an aircraft performance model that describes how the aircraft performs. The computer system may comprise memory operable to store a description of a real atmospheric model describing real atmospheric conditions along the trajectory. These real atmospheric conditions may correspond to the actual atmospheric conditions experienced when the flight was made (if the flight has already occurred), or may correspond to predicted weather conditions forecast to exist along the trajectory. The processor may be programmed to use the aircraft performance model and the description of the real atmospheric model to generate the description of the aircraft intent.

The present disclosure has particular benefit when used in systems that employ aircraft intent. As explained in the introduction, existing systems include trajectory computation infrastructures that are already in place to convert aircraft intent into corresponding descriptions of trajectories, for example using trajectory computation engines. This existing infrastructure may be employed with the present disclosure to generate the aircraft intent.

BRIEF DESCRIPTION OF THE DRAWINGS

In order that the present disclosure may be more readily understood, preferred embodiments will now be described, by way of example only, with reference to the accompanying drawings in which:

FIG. 4 shows an example of a ground-referenced description of an aircraft trajectory;

FIG. 5 shows an example of an air-referenced description of an aircraft trajectory;

DETAILED DESCRIPTION

Figure 1:
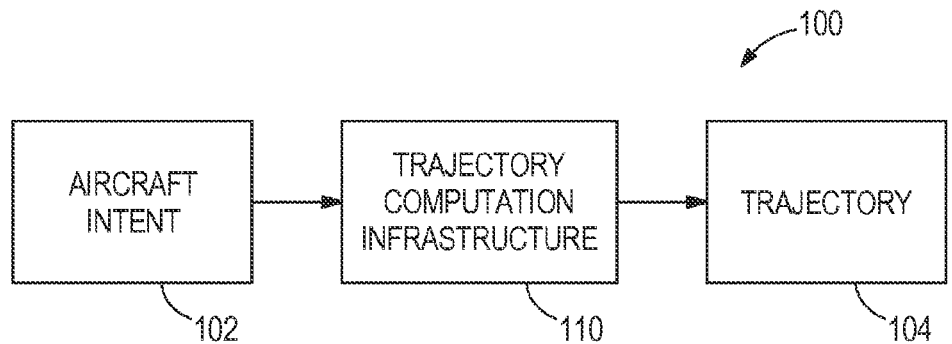
FIG. 1 is a system for computing an aircraft's trajectory using flight intent and aircraft intent.
Figure 2:
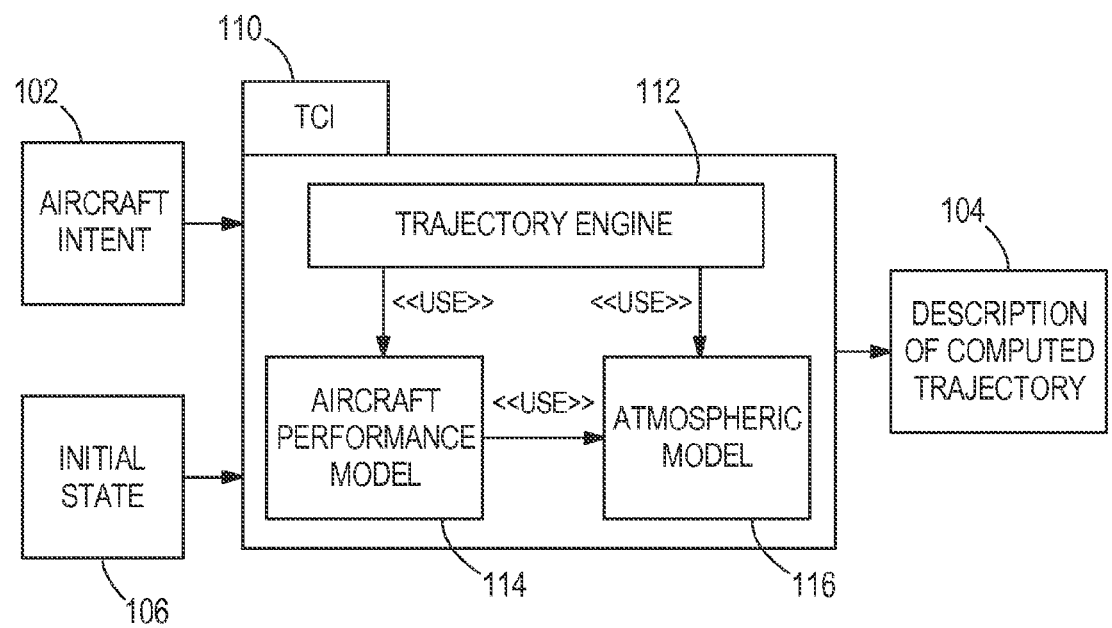
FIG. 2 shows the system of FIG. 1 in greater detail.

A computer system 100 for computing an aircraft's trajectory is shown in FIGS. 1 and 2.

FIG. 1 shows how aircraft intent 102 may be used to derive a description of an aircraft's trajectory 104. In essence, aircraft intent 102 is provided as an input to a trajectory computation infrastructure 110. The trajectory computation infrastructure 110 calculates an unambiguous trajectory 104 using the aircraft intent 102 and other inputs that are required to solve equations of motion of the aircraft. The trajectory computation infrastructure 110 may be air-based or land-based. For example, the trajectory computation infrastructure 110 may be associated with an aircraft's flight management system that controls the aircraft on the basis of a predicted trajectory that captures the airline operating preferences and business objectives. A land-based trajectory computation infrastructure 110 may be located at an air traffic control facility or a mission planning facility.

FIG. 2 shows the system of FIG. 1 in further detail. As can be seen, FIG. 2 shows that the trajectory computation infrastructure 110 comprises a trajectory engine 112. The trajectory engine 112 requires as inputs both the aircraft intent description 102 mentioned above and also the initial state 106 of the aircraft. The initial state 106 of the aircraft may be defined as part of the aircraft intent 102 in which case these two inputs are effectively one and the same.

In a preferred embodiment, the description of aircraft intent 102 is expressed using a formal language. The aircraft intent 102 may correspond to a set of instructions comprising configuration instructions that describe the aerodynamic configuration of the aircraft and motion instructions that describe the motion of the aircraft. The set of instructions will comply with a set of rules to ensure that the configuration instructions define the aerodynamic configuration of the aircraft and that the motion instructions close the degrees of freedom of equations of motion used to describe the aircraft motion. Thus, the aircraft intent 102 is an expression of a set of instructions in a formal language, an aircraft intent description language, which defines unambiguously the trajectory 104 of the aircraft. This expression is used by the trajectory engine 112 to solve the equations of motion that govern the aircraft's motion and thereby produce the resulting trajectory 104.

There exist in the art many different sets of equations of motion that describe an aircraft's motion. The sets of equations generally differ due to their complexity. In principle, any of these sets of equations may be used by the trajectory engine 112. The actual form of the equations of motion influences how the aircraft intent description language should be formulated because variables that appear in the equations of motion also appear in the instructions defining the aircraft intent 102.

The set of equations of motion may describe the motion of the aircraft's centre of gravity, with the aircraft considered as a mass-varying rigid solid. Three coordinates may describe the position of the aircraft's centre of mass (longitude, latitude and altitude) and three values describe the aircraft's attitude (roll, pitch and yaw). To derive the equations, a set of simplifying assumptions may be applied to the general equations describing atmospheric, powered flight.

The equations of motion will include variables relating to the aircraft's performance and meteorological conditions, and these are provided by the aircraft performance model 114 and the atmospheric model 116 which are described below. To solve the equations, the configuration of the aircraft must be specified. For example, information may be required to resolve the settings of the landing gear, speed brakes and high lift devices.

The aircraft intent description language is a formal language whose primitives are the instructions. The grammar of the formal language provides the framework that allows instructions to be combined into sentences that describe operations. Each operation contains a complete set of instructions that close the required six degrees of freedom in the equations of motion and so unambiguously defines the aircraft trajectory 104 over its associated operation interval. The instructions may be thought of as indivisible pieces of information that capture basic commands, guidance modes and control inputs at the disposal of the pilot and/or the flight management system.

For the trajectory engine 112 to provide a description of the computed trajectory 104 for the aircraft, the trajectory engine 112 uses two models: an aircraft performance model 114 and an atmospheric model 116.

The aircraft performance model 114 provides the values of the aircraft performance aspects required by the trajectory engine 112 to integrate the equations of motion. These values depend on the aircraft type for which the trajectory is being computed, the aircraft's current motion state (position, velocity, weight, etc) and the current local atmospheric conditions.

In addition, the performance values may depend on the intended operation of the aircraft, i.e. on the aircraft intent 102. For example, a trajectory engine 112 may use the aircraft performance model 114 to provide a value of the instantaneous rate of descent corresponding to a certain aircraft weight, atmospheric conditions (pressure altitude and temperature) and intended speed schedule (e.g. constant calibrated airspeed). The trajectory engine 112 may also request from the aircraft performance model 114 the values of the applicable limitations so as to ensure that the aircraft motion remains within the flight envelope. The aircraft performance model 114 is also responsible for providing the trajectory engine 112 with other performance-related aspects that are intrinsic to the aircraft, such as flap and landing gear deployment times.

The atmospheric model 116 provides information relating to environmental conditions, such as the state of the atmosphere, weather conditions, gravity and magnetic variation.

The trajectory engine 112 uses the inputs (i.e. the aircraft intent 102 and initial state 106), the aircraft performance model 114 and the atmospheric model 116 to solve a set of equations of motion. The trajectory engine 112 outputs a description of the unambiguous aircraft trajectory 104. This may be done in a number of ways. For example, the trajectory engine 112 may provide a graphical representation of the trajectory 104, such as a display of the flight path presented on one or more maps to indicate lateral and longitudinal positions with time. Of more interest to the present disclosure is a non-graphical provision of a description of the aircraft trajectory 104. For example, textual and numerical data may be provided to describe the aircraft trajectory 104, e.g. the time evolution of the flight path. This may be done in a tabular form.

In an embodiment of the present disclosure, descriptions of the aircraft trajectory 104 are provided that give details of aircraft parameters such as position, velocity or speed, bearing, altitude and flight path angle at successive points in time. The present disclosure makes use of the fact that these parameters may be expressed with reference to the ground or with reference to the air mass through which the aircraft is flying. For example, speed may be expressed as a ground speed or as an air speed. To determine the ground speed from a description of air speed, knowledge is required of how the air mass is behaving with respect to the ground. This behaviour is contained within the atmospheric model 116. Choice of atmospheric models 116 and, in particular, choice of synthesised atmospheric models 116 that describe imaginary atmospheric conditions may be used to provide an air-referenced description of an aircraft trajectory 104 that requires knowledge of the imaginary atmospheric model 116 used to obtain a corresponding true ground-referenced description of the aircraft trajectory 104. This allows a secure method of transmitting descriptions of aircraft trajectories 104 as will now be described in more detail.

Figure 3:
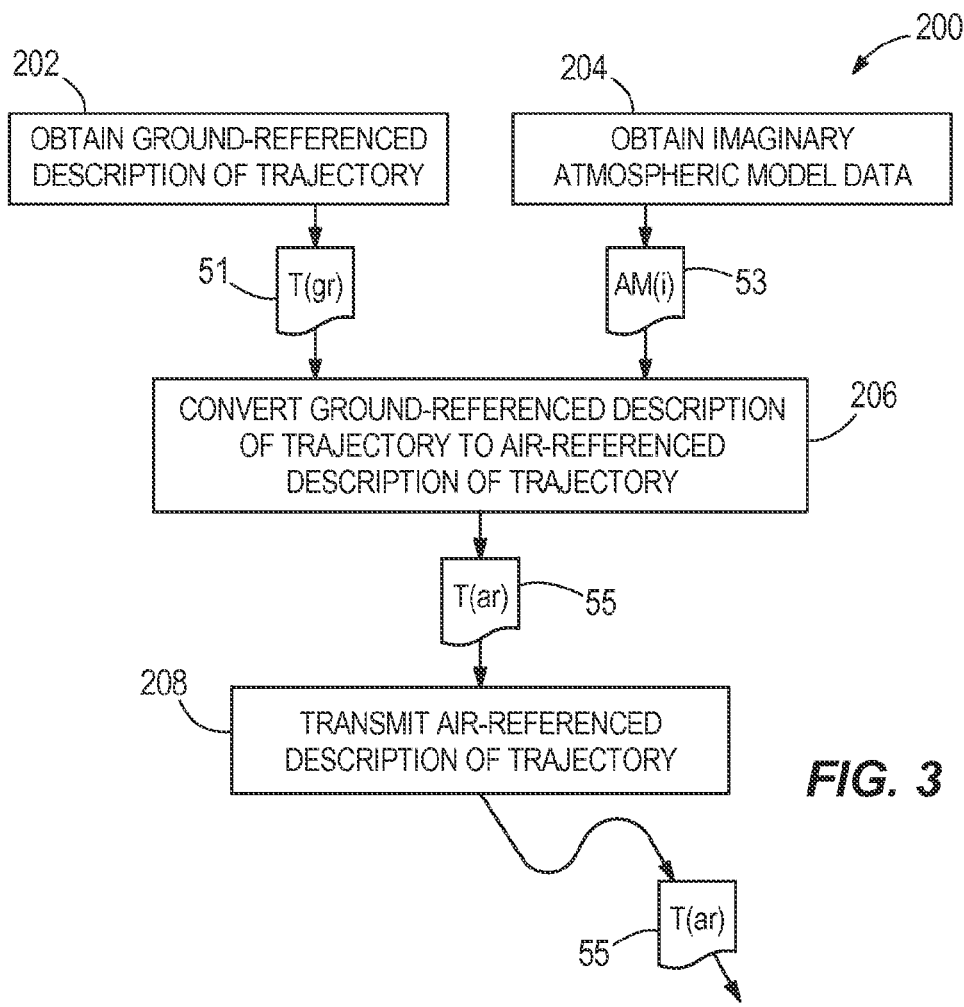
FIG. 3 shows a method of encrypting an aircraft trajectory according to an embodiment of the present disclosure.

FIG. 3 illustrates a method 200 of providing an encrypted description of an aircraft trajectory 104 according to an embodiment of the present disclosure. The method may be implemented using a computer system. At 202, the computer system obtains a ground-referenced description of an aircraft trajectory 51 and, at 204, imaginary atmospheric model data 53.

The ground-referenced description of the trajectory 51 is provided in tabular form, and an example is shown in FIG. 4. In this example, the trajectory 104 is defined by the altitude, longitude, latitude and ground speed at each of a series of time points. As will be appreciated, all these parameters are defined with reference to the ground. The units used to express each of the parameters is not critical.

The imaginary atmospheric model data 53 corresponds to an imaginary set of atmospheric conditions existing in the region of the flight path of the aircraft at the time of the flight. The imaginary atmospheric conditions 53 are generated to be different to the real atmospheric conditions. For example, the atmospheric conditions for a previous day may be used, and that day may be chosen at random. Alternatively, a linear combination may be formed of atmospheric conditions of multiple days in the past.

At 206, the imaginary atmospheric model data is used to convert the ground-referenced description of the trajectory 51 into an air-referenced description of the trajectory 55. As before, the description may be provided in tabular form, and an example is shown in FIG. 5. As will be seen, the air-referenced description 55 expresses air-referenced parameters and includes no ground-referenced parameters. In this example, the air-referenced trajectory 55 is defined by the aerodynamic flight path angle, the aerodynamic bearing, and the air speed expressed in Mach at each of a series of time points. The units used to express each of the parameters is not critical.

In addition, the initial ground-referenced position of the aircraft is provided, as this is required in the decryption step. Thus, a ground-referenced description of the initial position of the aircraft is provided along with an air-referenced description of the aircraft's speed and direction as the trajectory evolves. Thus, the trajectory of the aircraft may be calculated relative to the imaginary air mass, but the corresponding ground-referenced trajectory 51 may be found only with knowledge of the imaginary atmospheric model 53.

In the encryption step 206, the calculations required to convert the ground-referenced parameters 51 of FIG. 4 to the air-referenced parameters 55 of FIG. 5 are straightforward, and so will not be described in further detail here. Step 206 may be performed by a trajectory computation infrastructure 110 like that shown in FIGS. 1 and 2.

Thus, step 206 sees an encryption of the trajectory 104. The ground-referenced description of the trajectory 51 may be thought of as the plain text, the air-referenced description of the trajectory 55 may be thought of as the cipher text, and the imaginary atmospheric model data 53 may be thought of as the private key.

Figure 6:
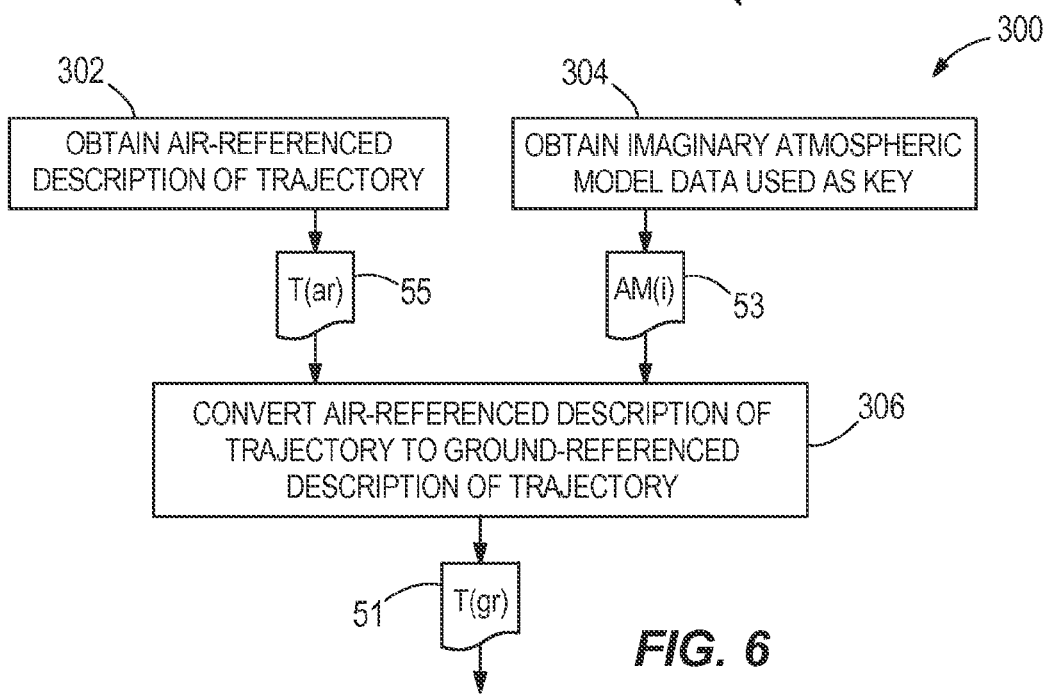
FIG. 6 shows a method of decrypting an aircraft trajectory according to an embodiment of the present disclosure.

The final step in FIG. 3 is the transmission of the air-referenced description of the trajectory 55, as shown at 208. Hence, FIG. 3 shows the encryption side of a secure transmission of an aircraft's trajectory 104. FIG. 6 shows the decryption side, namely a method 300 of providing a decrypted description of an aircraft trajectory 104 according to an embodiment of the present disclosure.

The method 300 may be implemented by a computer system. The computer system obtains an air-referenced description of an aircraft trajectory 55 at step 302. This description may be the description 55 transmitted at step 208 of FIG. 3. The imaginary atmospheric model data 53 used as the private key are obtained at step 304. As is well known in security systems, the imaginary atmospheric model data 53 will be transmitted to the receiving computer system independently of the air-referenced description of the aircraft's trajectory 55.

At step 306, the computer system uses the imaginary atmospheric model data 53 to convert the air-referenced description of the trajectory 55 to a ground-referenced description of the aircraft trajectory 51. That is, the initial position of the aircraft is used, along with the description of the speed and direction of travel relative to the imaginary air mass to provide a dead reckoning determination of the aircraft that is resolved relative to the ground through knowledge of the properties of the air mass provided by the imaginary atmospheric model data 53.

The ground-referenced description of the aircraft trajectory 51 will be the same as that of step 202 of FIG. 3, provided the same imaginary atmospheric model data 53 is used to decrypt the trajectory 104 as was used to encrypt the trajectory 104.

If an unintended party obtains the air-referenced description of the trajectory 55, they will not be able to ascertain the actual trajectory 104 and flight path of the aircraft. This is because all they can calculate is a dead reckoning position of the aircraft position relative to the imaginary air mass: without any knowledge of the properties of the air mass, the unintended party cannot relate the air-referenced position to a ground-referenced position.

Furthermore, if an unintended recipient were to generate a further set of imaginary atmospheric model data and use this in conjunction with the air-referenced description of the trajectory 55, then a ground-referenced description of the aircraft trajectory would result. However, this ground-referenced trajectory would not correspond to the actual ground-referenced trajectory 51 (of step 202) unless by chance the further set of imaginary atmospheric model data was identical to the set 53 used to encrypt the trajectory 104.

Generally, the imaginary atmospheric model data 53 will contain a very large number of parameters. That is, a 3D grid of many millions of nodes may be used to define the airspace through which the aircraft passes, and several parameters (such as wind vector, temperature and pressure) are recorded for each node of the grid for each of a number of successive time values. Consequently, the chances of a randomly generated atmospheric model corresponding to the encryption key are extremely remote.

Figure 7:
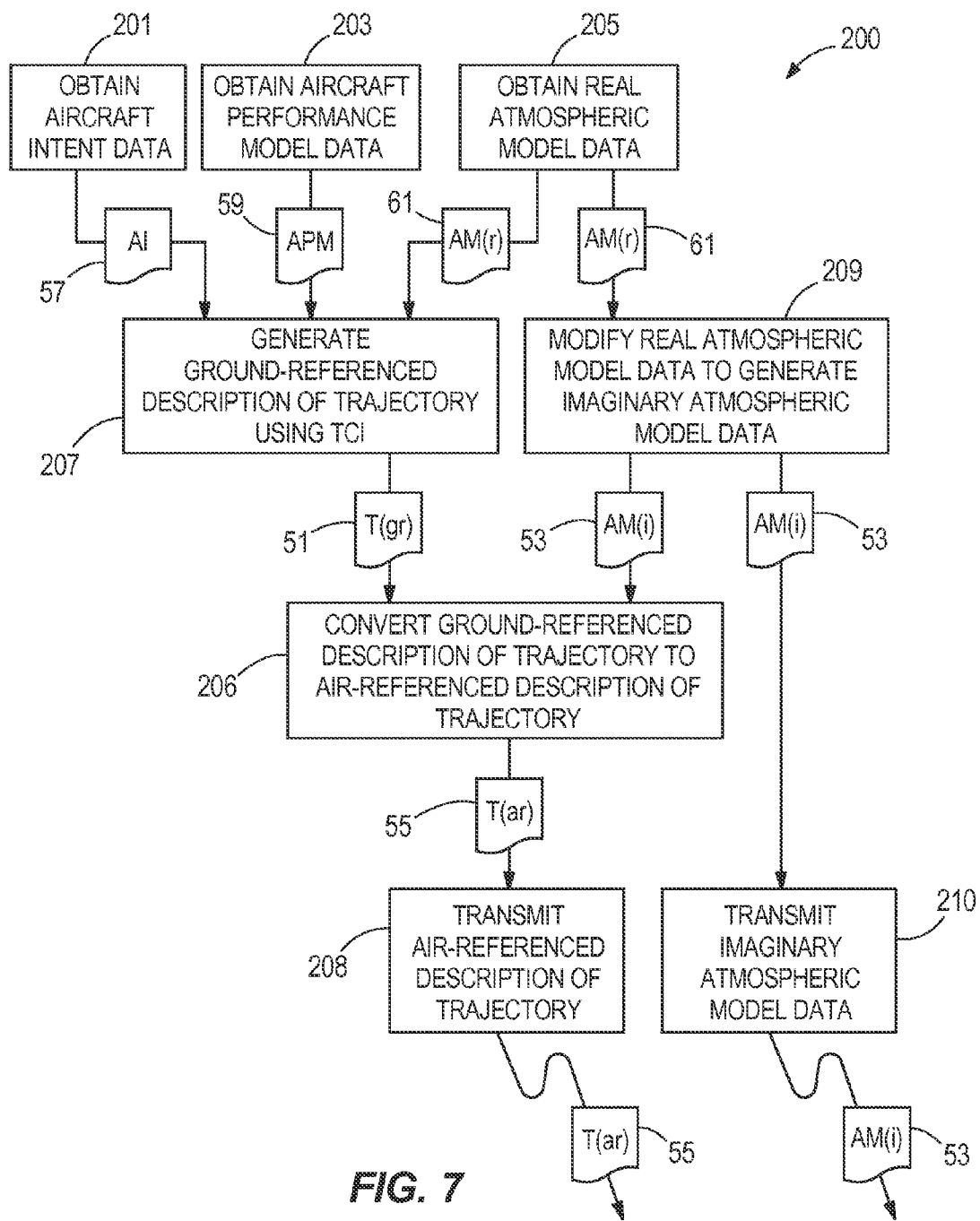
FIG. 7 shows a method of encrypting an aircraft trajectory according to another embodiment of the present disclosure.

FIG. 7 shows a method 200 of generating a ground-referenced aircraft trajectory 51 from aircraft intent data 57 (for example corresponding to the aircraft intent data 102 of FIGS. 1 and 2), and of encrypting that trajectory 51 to produce an air-referenced aircraft trajectory 55. Many of the steps of FIG. 7 correspond to those of FIG. 3, and corresponding reference numerals are used to indicate corresponding steps.

The method of FIG. 7 begins at steps 201, 203 and 205 where a trajectory computation engine 112 obtains as inputs aircraft intent data 57 at step 201, aircraft performance model data 59 at step 203 and real atmospheric model data 61 at step 205. The aircraft intent data 57 may be expressed in ground-referenced parameters and/or air-referenced parameters. If the data 57 contains air-referenced parameters, the real atmospheric model data 61 should be the same as was used to generate the aircraft intent data 57.

At step 207, the trajectory computation engine 112 uses the aircraft intent data 57, the aircraft performance model data 59 and the real atmospheric model data 61 to generate a ground-referenced description 51 of the corresponding real trajectory 104 that the aircraft intent data 102 defines. This description 51 is preferably in tabular form, like the exemplary table of FIG. 4. If desired, the corresponding real trajectory 104 may be displayed graphically so that an operator may see and approve the real trajectory 104.

At step 209, the trajectory computation infrastructure 110, or another component, modifies the real atmospheric model data 61 to generate imaginary atmospheric model data 53. This may be done in any commonly known way. Preferably, the modification has a high degree of randomness. For example, the coefficients contained in the real atmospheric model data 61 may be altered, for example by scaling with some random factor, Alternatively, coefficients may be mixed (e.g. a transposition of wind vector values, temperatures, pressures for different locations and/or different times). Alternatively, real atmospheric model data 61 from a previous day may be used, as already described.

The imaginary atmospheric model data 53 generated at step 209 is used at step 206 to convert the ground-referenced description of the aircraft trajectory 51 into an air-referenced description of the trajectory 55. At step 208, this air-referenced description of the aircraft trajectory 55 is transmitted to an intended recipient. To ensure that the intended recipient may decrypt the trajectory 104, the imaginary atmospheric model data 53 is also transmitted to the intended recipient. This is done separately, and may be implemented securely in many different ways. For example, imaginary atmospheric model data 53 may be generated periodically and uploaded to a recipient through a secure connection. Those imaginary atmospheric model data 53 may be used to encrypt trajectories 104 for a predetermined length of time, e.g. a day. Then encrypted trajectories may be sent to the recipient as the air-referenced descriptions 55 during that day and the already obtained imaginary atmospheric model data 53 may be used to decrypt the trajectories 104. A more specific example is given below in the description of FIG. 10.

Figure 8:
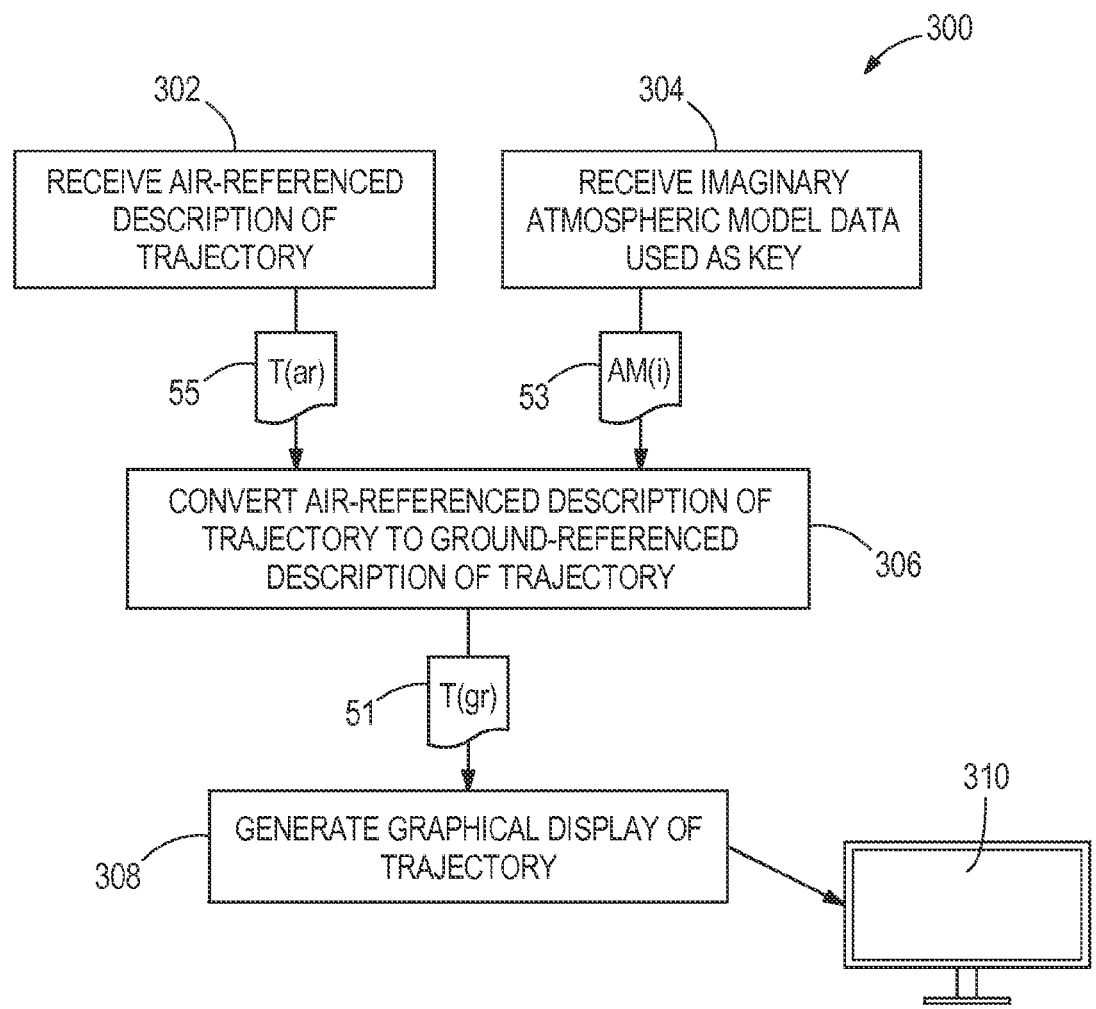
FIG. 8 shows a method of decrypting an aircraft trajectory according to another embodiment of the present disclosure.

FIG. 8 shows a further embodiment of a method 300 of decrypting a trajectory 104. At step 302, a trajectory computation engine 112 receives an air-referenced description of a trajectory 55. Beforehand, and separately, the trajectory computation engine 112 has received the imaginary atmospheric model data 53 used to generate the encrypted air-referenced trajectory 55. At step 306, the trajectory computation engine 112 uses the imaginary atmospheric data 53 to convert the air-referenced trajectory 55 back into the real ground-referenced trajectory 51. At step 308, the trajectory computation infrastructure 110 generates a display 310 of the real trajectory 104 such that an operator may view the trajectory 104. The operator may, for example, check and approve the trajectory 104 before authorising the flight to occur. The operator may be an air traffic controller or a mission planner.

A method 400 of sending securely a trajectory to an aircraft such that the aircraft may fly the trajectory will now be described with reference to FIG. 9. The method is quite general and may be used in many different applications. However, a non-limiting example of an application will be described with reference to FIG. 10. This application is a method 500 of planning and executing a mission of an unmanned air vehicle 520 using a ground control station 510. It should be understood that this is merely one possible application of the method 400, and should not be construed as a limiting example.

Method 400 comprises an initial step of encrypting a trajectory 104 using a method corresponding to the method 200 of FIG. 7. Method 400 continues to decrypt the encoded trajectory 104 using a method very similar in its initial steps to the method 300 of FIG. 8.

In more detail, a ground control station 510 is operating unmanned air vehicles including unmanned air vehicle 520. Ground control station 510 devises missions for the unmanned air vehicle 520, for example a surveillance mission where the unmanned air vehicle 520 is commanded to follow a trajectory 104 and to collect reconnaissance images during part of the flight. The present disclosure provides a way of sending the desired trajectory 104 to the unmanned aircraft 520 in a secure manner such that if the transmission were to be intercepted by an unintended third party, that third party would not be able to determine the trajectory 104.

The ground control station 510 is provided with a computer system 512 that includes a trajectory computation infrastructure 110. This ground-based computer system 512 obtains aircraft intent data 57 at step 201. This may be done in several ways. For example, an operator at the ground control station 510 may generate the aircraft intent data 57, for example by defining a mission and instructing the ground-based computer system 512 to generate aircraft intent data 57 that will meet the requirements of the mission. Alternatively, the ground-based computer system 512 may receive the aircraft intent data 57 from an external source or may retrieve the aircraft intent data 57 from memory either located locally or remotely.

The ground-based computer system 512 also obtains aircraft performance data 59 relating to the unmanned air vehicle 520 as indicated at step 203, and obtains atmospheric data 61 describing the real atmospheric conditions as indicated at step 205. These data 59 and 61 may be received by the ground-based computer system 512 from an external source or the ground-based computer system 512 may retrieve the aircraft intent data 57 from memory either located locally or remotely.

At step 207, the trajectory computation engine 112 of the ground-based computer system 512 uses the aircraft intent data 57, the aircraft performance model data 59 and the real atmospheric model data 61 to generate a ground-referenced description of the trajectory 51. The trajectory computation infrastructure 110 of the ground-based computer system 512 takes the real atmospheric model data 61 and manipulates it to generate imaginary atmospheric data 53, as indicated at step 209. This may be done as has been described above.

The trajectory computation infrastructure 110 of the ground-based computer system 512 uses the imaginary atmospheric model data 53 to convert the ground-referenced trajectory 51 into an air-referenced description of the trajectory 55, as shown at step 206. Thus, the ground control station 510 has generated both an air-referenced trajectory 55 and imaginary atmospheric model data 53 that are required by the unmanned air vehicle 520.

In practice, the imaginary atmospheric model data 53 is not generated at the same time as the air-referenced trajectory 55. The imaginary atmospheric data 53 is generated at some time before the unmanned air vehicle 520 leaves its ground base. This allows the imaginary atmospheric data 53 to be transferred to the unmanned air vehicle 520 in as secure a manner as possible. Then, missions may be sent to the unmanned air vehicle 520 while it remains on the ground at the base, or once it is airborne.

Figure 10:
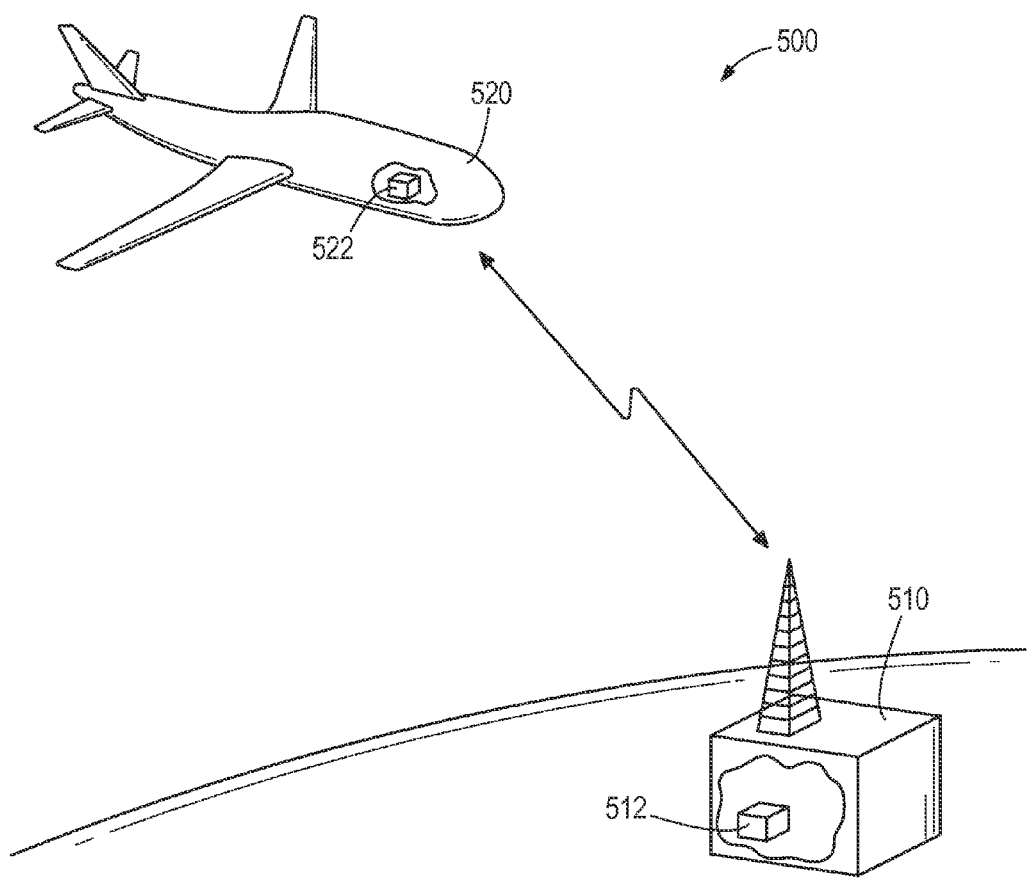
FIG. 10 shows an unmanned air vehicle that receives an encrypted trajectory description from a ground station.

For example, air-referenced trajectories 55 may be sent to the unmanned air vehicle 520 while it is on the ground over relatively insecure communication channels as the data 53 is effectively encrypted. Alternatively, air-referenced trajectories 55 may be sent to the unmanned air vehicle 520 once it is airborne, as shown in FIG. 10. This allows more flexible use of the unmanned air vehicle 520. Whether sent while the unmanned air vehicle 520 is on the ground or in the air, these air-referenced trajectories 55 are generated using the imaginary atmospheric data 53 already transferred to the unmanned air vehicle 520. Of course, the imaginary atmospheric model data 53 could also be sent to the unmanned air vehicle 520 while it is airborne, although this should not be done at the same time as sending an air-referenced trajectory 55.

Thus, as just described, the ground control station 510 transmits or transfers the imaginary atmospheric data 53 to the unmanned air vehicle 520 at step 208 and transmits or transfers the air-referenced trajectory data 55 at step 208.

Turning to the decryption of the real trajectory 104, the unmanned air vehicle 520 receives the imaginary atmospheric data 53 as indicated at step 304 and receives the air-referenced trajectory data 55 as indicated at step 302. The unmanned air vehicle 520 comprises a computer system 522. This air-based computer system 522 comprises a trajectory computation infrastructure 110. The computer system may also comprise other units like a flight management computer.

The trajectory computation engine 112 of the air-based computer system 522 uses the imaginary atmospheric model data 53 to convert the air-referenced trajectory 55 into a ground referenced trajectory 51, as indicated at step 306.

At steps 308 and 310, the air-based computer system 522 obtains the aircraft performance model data 59 pertaining to the unmanned air vehicle 520 and the real atmospheric conditions model data 61 respectively. For example, these data 59 and 61 may be stored in memory on the unmanned air vehicle 520 for retrieval by the air-based computer system 522. The aircraft performance model data 59 is unlikely to change often, and so may be updated from time to time when the aircraft is on the ground. The real atmospheric model data 61 is likely to be saved to the memory of the unmanned air vehicle 520 more frequently. For example, the real atmospheric data 61 may be updated when the unmanned air vehicle 520 is on the ground. If necessary, the real atmospheric data 61 may be transmitted to the unmanned air vehicle 520 when it is airborne.

At step 312, the trajectory computation infrastructure 110 of the ground-based computer system 522 uses the ground-referenced trajectory data 51, the aircraft performance model data 59 and the real atmospheric model data 61 to generate an aircraft intent 57, that is data describing an aircraft intent 102 that will result in the unmanned air vehicle 520 flying the real trajectory 104.

It is to be remembered that while a particular aircraft intent 102 will result in a unique trajectory 104, any particular trajectory 104 will not necessarily have a corresponding unique aircraft intent 102. That is to say, a particular trajectory 104 may be the result of multiple different aircraft intents 102. Therefore, the aircraft intent data 57 produced at step 312 may not be the same as the aircraft intent data 57 obtained at step 201.

In some applications, this will not be material. For example, the trajectory 104 flown by the aircraft 520 may be what matters, and how the aircraft 520 is operated to fly that trajectory 104 is not so important. This is particularly true as by trajectory 104, a four-dimensional description of the flight path is meant such that the aircraft intent data 57 generated at step 312 will still ensure that the unmanned air vehicle 520 follows the desired flight path while also ensuring the aircraft 520 reaches each point on the flight path at the desired time.

In other applications, it may be desirable for the aircraft intent data 57 generated by the unmanned air vehicle 520 at step 312 to be the same as the aircraft intent data 57 used by the ground control station 510, or to be as similar to that aircraft intent data 57 as possible. Such an approach is possible. For example, methods to do this are described in European Patent Application No. 12382273.6, also in the name of The Boeing Company, and incorporated herein in its entirety by reference.

Essentially, this patent application describes generating candidate aircraft intents that may produce the required trajectory (based on aircraft performance data and atmospheric conditions data), forming cost functions for the candidate aircraft intents and performing a multi-objective cost function optimisation to produce a selection of candidate aircraft intents with the lowest cost functions. In this context, the candidate aircraft intent with the lowest cost function value may be selected as the aircraft intent 57 at step 312, and it should correspond well with the aircraft intent 57 obtained at step 201.

With the aircraft intent data 57 generated at step 312, step 314 uses this aircraft intent data 57 to fly the unmanned air vehicle 520. The air-based computer system 522 may extract the instructions contained in the aircraft intent data 57 and use these instructions to prompt the flight management computer to control the unmanned air vehicle 520 such that it flies the trajectory 104. For example, the air-based computer system 522 may convert the instructions into autopilot command signals that are passed to the flight management computer to cause it to operate the aircraft 520 (in much the way an autopilot operates).

Figure 9:
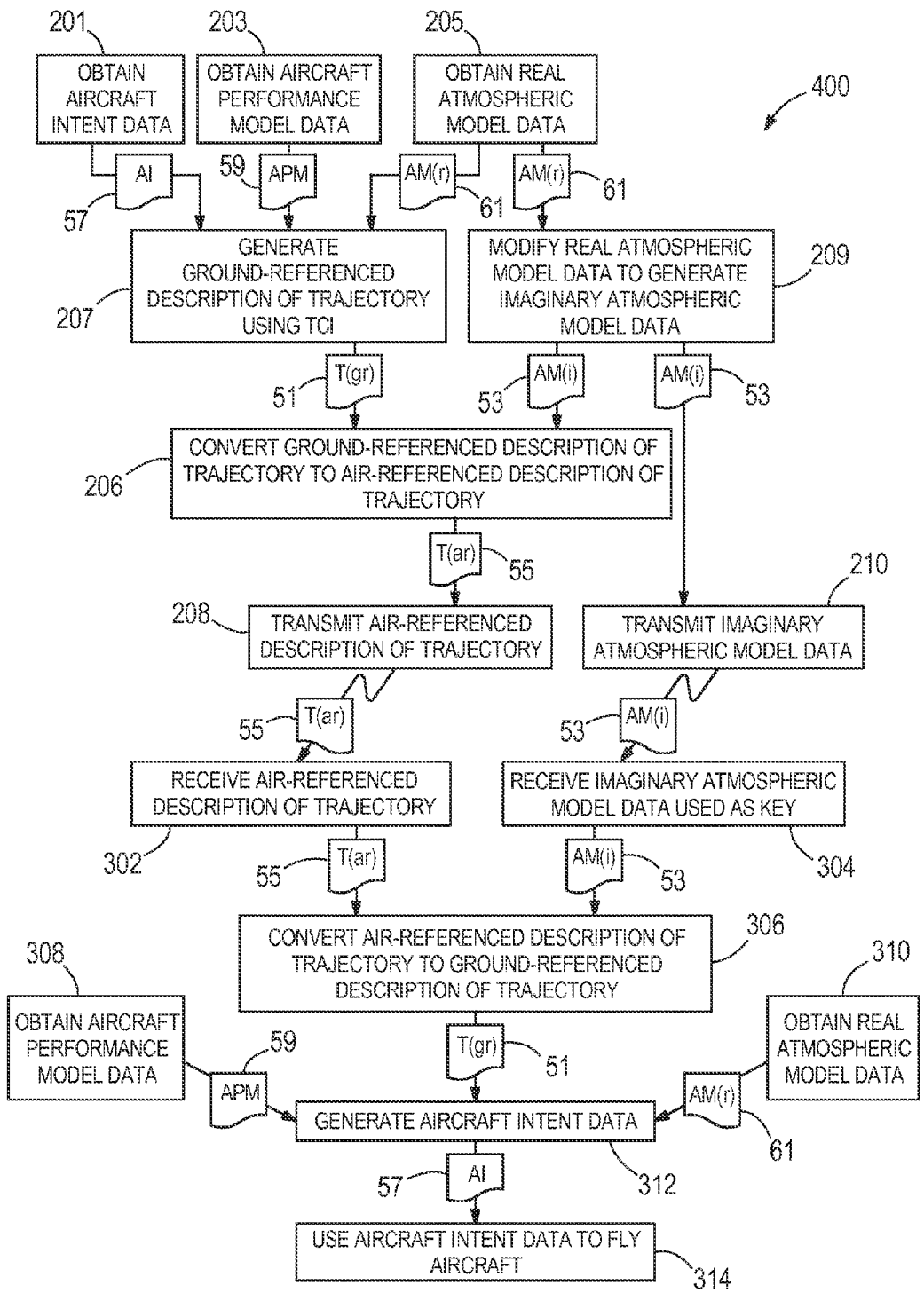
FIG. 9 shows a method of encrypting an aircraft trajectory, transmitting separately the encrypted aircraft trajectory and a description of the imaginary atmospheric model used to encrypt the trajectory, and decrypting the aircraft trajectory.

Thus, FIGS. 9 and 10 show how the present disclosure may be applied to the problem of providing a secure method of sending mission plans to an unmanned air vehicle 520 while it is airborne.

The above described method of encryption of a description of a trajectory prior to transmission may also be used in a conjunction with a method of compression described in European Patent Application No. 12382273.6 that was mentioned above.

For example, to communicate a trajectory, whether real or encrypted as above, it may be desirable to apply compression algorithms so that a bandwidth is not exceeded. Lossless compression algorithms are available for this purpose. However, to achieve high compression ratios, it is often necessary to apply lossy compression algorithms. Such lossy algorithms are undesirable since the resolution of the communicated trajectory is diminished.

However, aircraft intent data can unambiguously define a corresponding trajectory yet generally result in data files of much reduced size. This is because rather than defining a trajectory as a set of parameters expressed for a series of points in time, they can express the behaviour of the aircraft succinctly during a time period that may span many points in time. For example, an aircraft intent instruction may be "maintain Mach 0.81 between waypoint ALPHA and waypoint GAMMA".

Hence, inferring aircraft intent from a description of a trajectory can therefore be used as a method of compression of the trajectory. To maintain security, the aircraft intent data should be expressed in air-referenced parameters. However, any instance of aircraft intent that unambiguously defines the trajectory can be used (remembering that a trajectory may be the result of many different aircraft intents, so it does not matter which intent is inferred).

Once air-referenced aircraft intent data has been inferred, this compressed aircraft intent data may be transmitted instead of the air-referenced trajectory data 55. The aircraft intent can be decompressed to express the trajectory at the receiving system.

It has been shown experimentally that compression ratios (the ratio of size of trajectory data to size of aircraft intent data) of 55:1 can be achieved using the above-described method.

Figure 11A:
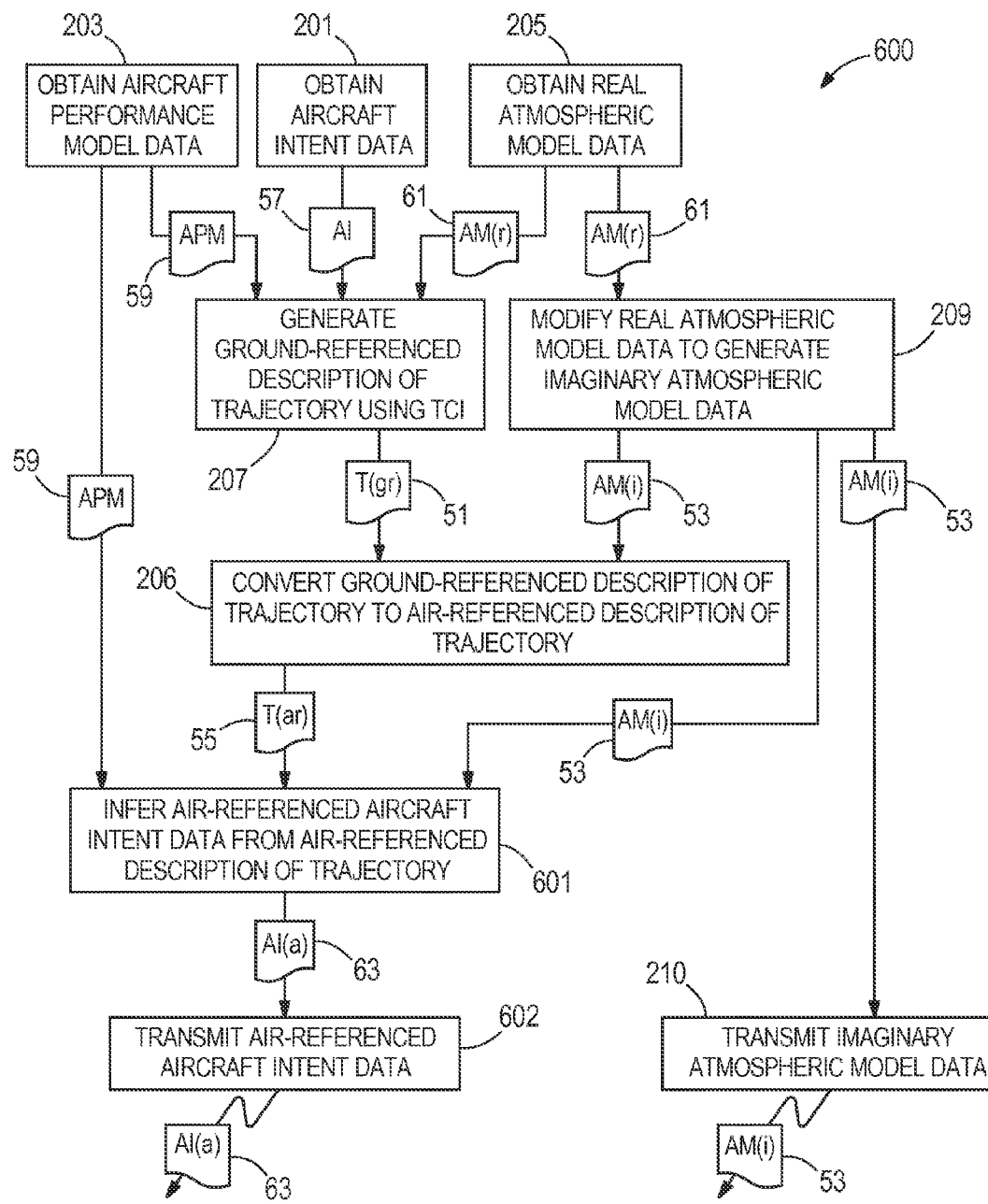
FIGS. 11*a* and 11*b* show a method of encrypting an aircraft trajectory, compressing the description into air-referenced aircraft intent data, transmitting separately the encrypted and compressed air-referenced aircraft intent data and a description of the imaginary atmospheric model used to encrypt the trajectory, and decrypting air-referenced aircraft intent data to recover the ground-referenced aircraft trajectory.
Figure 11B:
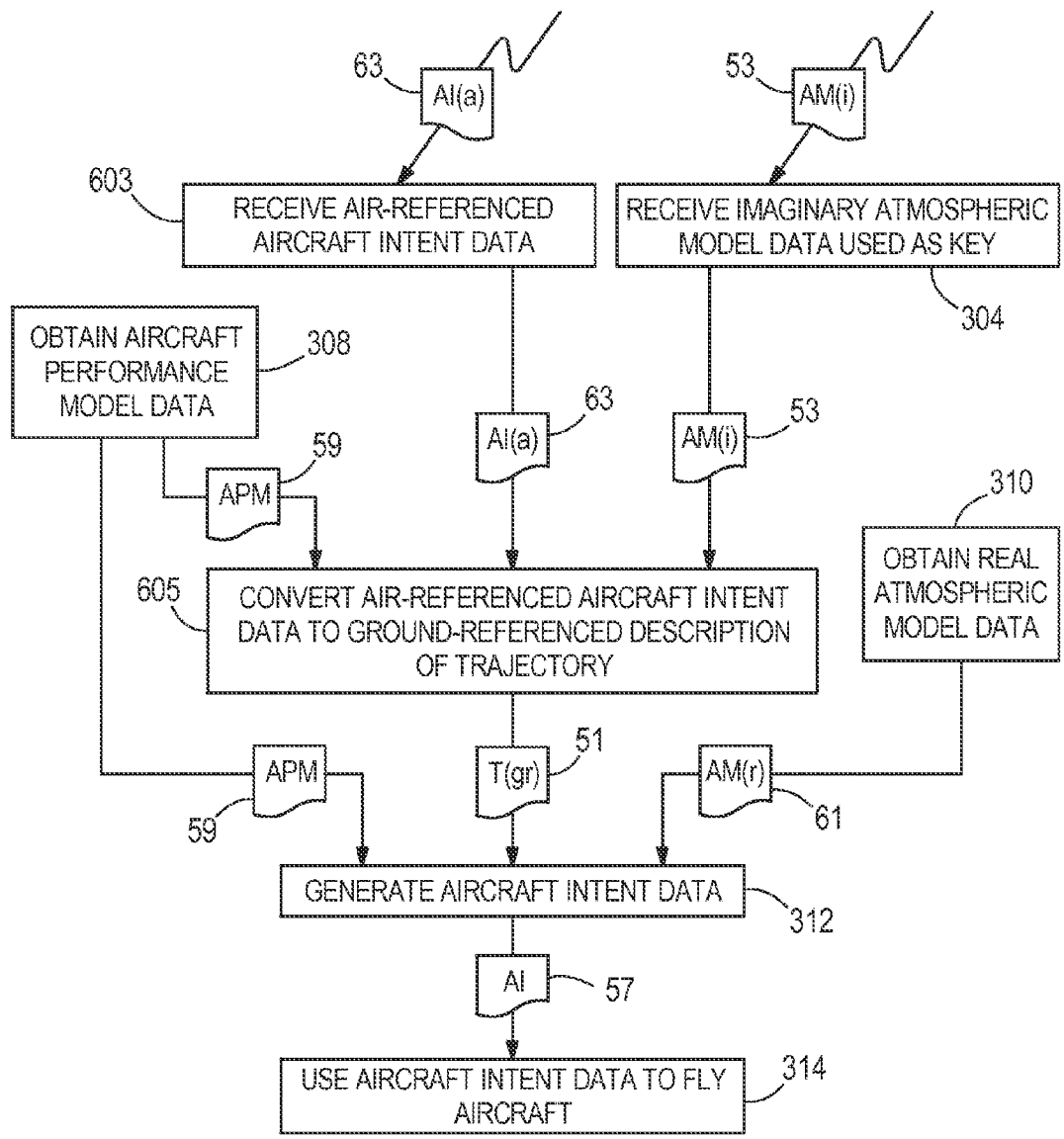

FIGS. 11a and 11b show an adaptation of the method of FIG. 9 to include such a compression technique. As much of the method is the same as previously described, the common parts are only briefly discussed below.

A method 600 of sending securely an encrypted and compressed trajectory to unmanned air vehicle 520 is shown in FIGS. 11a and 11b. FIG. 11a shows the transmission side and FIG. 11b the receiving side.

Aircraft intent data 57 is obtained at step 201, aircraft performance data 59 is obtained at step 203, and real atmospheric model data 61 is obtained at step 205. At step 207, the aircraft intent data 57, the aircraft performance model data 59 and the real atmospheric model data 61 are used to generate a ground-referenced description of the trajectory 51. The real atmospheric model data 61 is used to generate imaginary atmospheric data 53, as indicated at step 209. The imaginary atmospheric model data 53 is used to convert the ground-referenced trajectory 51 into an air-referenced description of the trajectory 55, as shown at step 206.

Rather than transmitting the air-referenced description of the trajectory 55 to the unmanned air vehicle 520, step 601 sees the trajectory computation infrastructure 110 infer an air-referenced aircraft intent 63 using the air-referenced description of the trajectory 55, the aircraft performance model data 59 and the imaginary atmospheric conditions data 53. This may be done in accordance with the method of European Patent Application No. 12382273.6, described above. For the present purposes, any valid aircraft intent data may be generated and it need not correspond exactly to the aircraft intent data 59 obtained at step 203, provided that the aircraft intent data 63 describes the same trajectory. The trajectory computation infrastructure 110 uses the imaginary atmospheric model data 53 so as to provide the aircraft intent data 63 expressed in air-referenced parameters with reference to the imaginary atmospheric conditions, thereby ensuring the secure encryption is preserved. As noted above, these data 63 must include one ground-referenced position though and this is preferably the initial conditions of the unmanned air vehicle 520. As explained above, this allows for dead-reckoning of the subsequent positions using the imaginary atmospheric model data 53.

At step 210, the imaginary atmospheric data 53 is passed to the unmanned air vehicle 520 and at step 602 the air-referenced aircraft intent data 63 is passed to the unmanned air vehicle 520.

Turning to the decryption of the real trajectory 104 shown in FIG. 11b, the unmanned air vehicle 520 receives the imaginary atmospheric data 53 as indicated at step 304, receives the air-referenced aircraft intent data 63 as indicated at step 603 and obtains the aircraft performance model data 59 as indicated at step 308. The imaginary atmospheric model data 53 and aircraft performance model data 59 are used to convert the air-referenced aircraft intent data 59 into a ground-referenced trajectory 51, as indicated at step 605.

At step 310, the real atmospheric conditions model data 61 is obtained. At step 312, the ground-referenced trajectory data 51, the aircraft performance model data 59 and the real atmospheric model data 61 is used to generate an aircraft intent 57, that is data describing an aircraft intent 102 that will result in the unmanned air vehicle 520 flying the real trajectory 104, as was previously described with respect to FIG. 9. This aircraft intent may be expressed in ground-referenced parameters, air-referenced parameters or a combination of both. With the aircraft intent data 57 generated at step 312, step 314 uses this aircraft intent data 57 to fly the unmanned air vehicle 520.

Those skilled in the art will appreciate that variations may be made to the above embodiments without departing from the scope of the disclosure that is defined by the appended claims.

For example, as noted above, the method of FIG. 9 has many applications and is not limited to the context provided by FIG. 10. For example, the aircraft 520 need not be unmanned. The control station 510 need not be ground based: instead, it may be air based, for example a manned aircraft commanding one or more manned aircraft 520 or commanding one or more unmanned aircraft 520. While the ground control station 510 is shown at a single location, it may be distributed geographically and part may be ground based and part may be air based.

In addition to sending trajectories 104 to aircraft 520, the present disclosure may be used to communicate trajectories 104 from one ground location to another. For example, a proposed trajectory 104 may be sent from one location to another for review and approval.

The invention claimed is:

1. A computer-implemented method of communicating an aircraft trajectory using encryption and decryption of a description of the aircraft trajectory, comprising:

on a sender's side:
  obtaining a ground-referenced description of the trajectory of the aircraft expressed in ground-referenced parameters;
  obtaining a description of a fictional atmospheric model describing fictional atmospheric conditions along the trajectory;
  using the description of the fictional atmospheric model to encrypt the ground-referenced description of the aircraft trajectory by converting the ground-referenced description of the aircraft trajectory into an air-referenced description of the aircraft trajectory expressed in air-referenced parameters with respect to the fictional atmospheric model; and
  making available to the receiver the description of the fictional atmospheric conditions and air-referenced data from which the aircraft trajectory is unambiguously determined;

and
on a receiver's side:
  receiving the description of the fictional atmospheric conditions and the air-referenced data from which the aircraft trajectory is unambiguously determined;
  using the description of the fictional atmospheric conditions to decrypt air-referenced data from which the aircraft trajectory is unambiguously determined by converting the air-referenced data from which the aircraft trajectory is unambiguously determined back into the ground-referenced description of the aircraft trajectory expressed in ground-referenced parameters;
  obtaining a description of a real atmospheric model describing real atmospheric conditions along the trajectory;
  obtaining an aircraft performance model that describes how the aircraft performs; and
  using the description of a real atmospheric model and an aircraft performance model to convert the ground-referenced description of the aircraft trajectory into a description of aircraft intent corresponding to a computer language description expressed using a formal language, wherein the description of the aircraft intent is a description of how the aircraft is to be flown expressed as instructions that provides a complete description of the aircraft's behavior such that all degrees of freedom of motion are defined, and using the description of aircraft intent to fly the aircraft.

2. The method of claim 1, wherein:
the air-referenced data from which the aircraft trajectory is unambiguously determined comprises air-referenced aircraft intent data that provides a description of aircraft intent of the aircraft expressed in air-referenced parameters corresponding to a computer language description expressed using a formal language, wherein the description of the aircraft intent is a description of how the aircraft is to be flown expressed as instructions that provides a complete description of the aircraft's behavior such that all degrees of freedom of motion are defined and such that a unique trajectory is calculated unambiguously from the description of aircraft intent; and the method comprises using the air-referenced description of the aircraft trajectory, the description of the fictional atmospheric model and an aircraft performance model that describes how the aircraft performs to generate the air-referenced aircraft intent data.

3. The method of claim 1, wherein the air-referenced data from which the aircraft trajectory is unambiguously determined is the air-referenced description of the aircraft trajectory expressed in air-referenced parameters with respect to the fictional atmospheric model.

4. The method of claim 1, wherein the ground-referenced description of the aircraft trajectory and/or the air-referenced description of the aircraft trajectory comprises one or more computer data files representing a time-evolving series of either ground-referenced or air-referenced parameters respectively.

5. The method of claim 4, wherein the ground-referenced parameters of the ground-referenced description of the aircraft trajectory comprise any of longitude, latitude, altitude, ground speed, bearing and direction.

6. The method of claim 4, wherein the air-referenced parameters of the air-referenced description of the aircraft trajectory comprise any of air speed, Mach, aerodynamic bearing, and aerodynamic flight path angle.

7. The method of claim 1, further comprising, on the sender side:
obtaining a description of aircraft intent of the aircraft corresponding to a computer language description expressed using a formal language, wherein the description of the aircraft intent is a description of how the aircraft is to be flown expressed as instructions that provides a complete description of the aircraft's behaviour such that all degrees of freedom of motion are defined and such that a unique trajectory is calculated unambiguously from the description of aircraft intent;
obtaining a description of a real atmospheric model describing real atmospheric conditions along the trajectory;
obtaining an aircraft performance model that describes how the aircraft performs; and
using the aircraft performance model and the description of the real atmospheric conditions to generate the ground-referenced description of the aircraft trajectory expressed in the ground-referenced parameters from the description of the aircraft intent.

8. The method of claim 1, wherein the method either:
comprises generating randomly the fictional atmospheric conditions; or comprises obtaining a description of a real atmospheric model describing real atmospheric conditions along the trajectory and altering the real atmospheric conditions to form the fictional atmospheric conditions.

9. The method of claim 1, wherein the description of the fictional atmospheric conditions and the air-referenced data from which the aircraft trajectory is unambiguously determined are passed from sender to receiver separately.

10. The method of claim 1, comprising including in the air-referenced data from which the aircraft trajectory is unambiguously determined, a ground-referenced position of the aircraft, optionally a ground-referenced initial position of the aircraft.

11. A computer infrastructure operable to communicate an aircraft trajectory using encryption and decryption of a description of the aircraft trajectory, comprising an encryption computer system and a decryption computer system, wherein
the encryption computer system comprises:
memory operable to store a ground-referenced description of the trajectory of the aircraft expressed in ground-referenced parameters;
memory operable to store a description of a fictional atmospheric model describing fictional atmospheric conditions along the trajectory;
an encryption processor programmed to use the description of the fictional atmospheric model to encrypt the ground-referenced description of the aircraft trajectory by converting the ground-referenced description of the aircraft trajectory into an air-referenced description of the aircraft trajectory expressed in air-referenced parameters with respect to the fictional atmospheric model, and to make available to the decryption computer system the description of the fictional atmospheric conditions and air-referenced data from which the aircraft trajectory is unambiguously determined;
and
the decryption computer system comprises:
a receiver operable to receive the description of the fictional atmospheric conditions and the air-referenced data from which the aircraft trajectory is unambiguously determined;
memory operable to store the description of the fictional atmospheric conditions and the air-referenced data from which the aircraft trajectory is unambiguously determined;
a decryption processor programmed to:
use the description of the fictional atmospheric conditions to decrypt the air-referenced data from which the aircraft trajectory is unambiguously determined by converting the air-referenced data from which the aircraft trajectory is unambiguously determined back into the ground-referenced description of the aircraft trajectory expressed in ground-referenced parameters;
obtain a description of a real atmospheric model describing real atmospheric conditions along the trajectory;
obtain an aircraft performance model that describes how the aircraft performs; and
using the description of a real atmospheric model and an aircraft performance model to convert the ground-referenced description of the aircraft trajectory into a description of aircraft intent corresponding to a computer language description expressed using a formal language, wherein the description of the aircraft intent is a description of how the aircraft is to be flown expressed as instructions that provides a complete description of the aircraft's behavior such that all degrees of freedom of motion are defined, and using the description of aircraft intent to fly the aircraft.

12. The computer infrastructure of claim 11, wherein:
the air-referenced data from which the aircraft trajectory is unambiguously determined comprises air-referenced aircraft intent data that provides a description of aircraft intent of the aircraft expressed in air-referenced parameters corresponding to a computer language description expressed using a formal language, wherein the description of the aircraft intent is a description of how the aircraft is to be flown expressed as instructions that provides a complete description of the aircraft's behavior such that all degrees of freedom of motion are defined and such that a unique trajectory is calculated unambiguously from the description of aircraft intent; and
the encryption processor is further programmed to use the air-referenced description of the aircraft trajectory, the description of the fictional atmospheric model and an aircraft performance model that describes how the aircraft performs to generate the air-referenced aircraft intent data.

13. The computer infrastructure of claim 11, wherein the air-referenced data from which the aircraft trajectory is unambiguously determined is the air-referenced description of the aircraft trajectory expressed in air-referenced parameters with respect to the fictional atmospheric model.

14. The computer infrastructure of claim 11, wherein the ground-referenced description of the aircraft trajectory and/or the air-referenced description of the aircraft trajectory comprises one or more computer data files representing a time-evolving series of either ground-referenced or air-referenced parameters respectively.

15. The computer infrastructure of claim 14, wherein the ground-referenced parameters of the ground-referenced description of the aircraft trajectory comprise any of longitude, latitude, altitude, ground speed, bearing and direction.

16. The computer infrastructure of claim 11, wherein the description of the fictional atmospheric conditions and the air-referenced data from which the aircraft trajectory is unambiguously determined is made available from the encryption computer system to the decryption computer system separately.

* * * * *